United States Patent
Rolin et al.

(10) Patent No.: US 9,881,747 B2
(45) Date of Patent: Jan. 30, 2018

(54) SOLID STATE ULTRACAPACITOR

(71) Applicant: The United States of America as Represented by the Administrator of the National Aeronautics and Space Administration, Washington, DC (US)

(72) Inventors: Terry D. Rolin, Elkmont, AL (US); Curtis W. Hill, Meridianville, AL (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 15/010,884

(22) Filed: Jan. 29, 2016

(65) Prior Publication Data

US 2017/0221648 A1 Aug. 3, 2017

(51) Int. Cl.

| | |
|---|---|
| *H01G 11/84* | (2013.01) |
| *C04B 35/468* | (2006.01) |
| *H01G 4/12* | (2006.01) |
| *C04B 35/628* | (2006.01) |
| *C04B 35/626* | (2006.01) |
| *C04B 35/63* | (2006.01) |

(Continued)

(52) U.S. Cl.
CPC ......... *H01G 11/84* (2013.01); *C04B 35/4682* (2013.01); *C04B 35/6264* (2013.01);
(Continued)

(58) Field of Classification Search
None
See application file for complete search history.

(56) References Cited

U.S. PATENT DOCUMENTS

| | | |
|---|---|---|
| 4,131,903 A | 12/1978 | Schmelz et al. |
| 4,192,840 A | 3/1980 | Schmelz et al. |

(Continued)

OTHER PUBLICATIONS

Chung et al. "Controlling internal barrier in low loss BaTiO3 supercapacitors", Appl. Phys. Lett. 94, 072903, pp. 1-3, 2009.*

*Primary Examiner* — Mary Wilczewski
*Assistant Examiner* — Erik T Peterson
(74) *Attorney, Agent, or Firm* — James J. McGroary; Mark P. Dvorscak

(57) ABSTRACT

An ink of the formula: 60-80% by weight $BaTiO_3$ particles coated with $SiO_2$; 5-50% by weight high dielectric constant glass; 0.1-5% by weight surfactant; 5-25% by weight solvent; and 5-25% weight organic vehicle. Also a method of manufacturing a capacitor comprising the steps of: heating particles of $BaTiO_3$ for a special heating cycle, under a mixture of 70-96% by volume $N_2$ and 4-30% by volume $H_2$ gas; depositing a film of $SiO_2$ over the particles; mechanically separating the particles; incorporating them into the above described ink formulation; depositing the ink on a substrate; and heating at 850-900° C. for less than 5 minutes and allowing the ink and substrate to cool to ambient in $N_2$ atmosphere. Also a dielectric made by: heating particles of $BaTiO_3$ for a special heating cycle, under a mixture of 70-96% by volume $N_2$ and 4-30% by volume $H_2$ gas; depositing a film of $SiO_2$ over the particles; mechanically separating the particles; forming them into a layer; and heating at 850-900° C. for less than 5 minutes and allowing the layer to cool to ambient in $N_2$ atmosphere.

17 Claims, 24 Drawing Sheets
(16 of 24 Drawing Sheet(s) Filed in Color)

(51) Int. Cl.
*C04B 35/638* (2006.01)
*H01G 11/56* (2013.01)
*C04B 35/64* (2006.01)
*C04B 35/622* (2006.01)

(52) U.S. Cl.
CPC .... *C04B 35/6268* (2013.01); *C04B 35/62222* (2013.01); *C04B 35/62807* (2013.01); *C04B 35/62813* (2013.01); *C04B 35/62884* (2013.01); *C04B 35/62897* (2013.01); *C04B 35/6303* (2013.01); *C04B 35/638* (2013.01); *C04B 35/64* (2013.01); *H01G 4/1227* (2013.01); *H01G 11/56* (2013.01); C04B 2235/3215 (2013.01); C04B 2235/3217 (2013.01); C04B 2235/3236 (2013.01); C04B 2235/3418 (2013.01); C04B 2235/36 (2013.01); C04B 2235/5445 (2013.01); C04B 2235/768 (2013.01); C04B 2235/96 (2013.01)

(56) References Cited

U.S. PATENT DOCUMENTS

| | | |
|---|---|---|
| 4,761,711 A | 8/1988 | Hiremath et al. |
| 5,335,139 A * | 8/1994 | Nomura ............... H01G 4/1227 252/519.1 |
| 6,255,122 B1 | 7/2001 | Duncombe et al. |
| 7,428,137 B2 | 9/2008 | Dowgiallo, Jr. |
| 7,557,055 B2 | 7/2009 | Zhang et al. |
| 8,334,464 B2 | 12/2012 | Edwards et al. |
| 8,414,962 B2 | 4/2013 | McKinstry et al. |
| 8,564,798 B2 | 10/2013 | Yang et al. |
| 8,609,017 B2 | 12/2013 | Sengupta et al. |
| 2003/0100438 A1* | 5/2003 | Kuo ..................... C04B 35/4682 501/137 |
| 2004/0233611 A1* | 11/2004 | Borland .................. H01G 4/01 361/306.3 |
| 2005/0260410 A1* | 11/2005 | Fujikawa ............. C04B 35/4682 428/403 |
| 2006/0223692 A1* | 10/2006 | Ito ..................... C04B 35/62685 501/139 |
| 2008/0280748 A1* | 11/2008 | Nishigaki .............. B82Y 30/00 501/77 |
| 2009/0073635 A1* | 3/2009 | Taniguchi ........... C04B 35/4682 361/321.4 |
| 2009/0135546 A1* | 5/2009 | Wang ..................... B32B 18/00 361/321.2 |
| 2010/0209779 A1* | 8/2010 | Wendman .............. H01G 9/025 429/310 |
| 2013/0335882 A1 | 12/2013 | Ma et al. |
| 2014/0022694 A1 | 1/2014 | Reynolds et al. |
| 2014/0179826 A1 | 6/2014 | Tanabe |
| 2017/0174915 A1* | 6/2017 | Rolin ................... C09D 11/033 |

\* cited by examiner

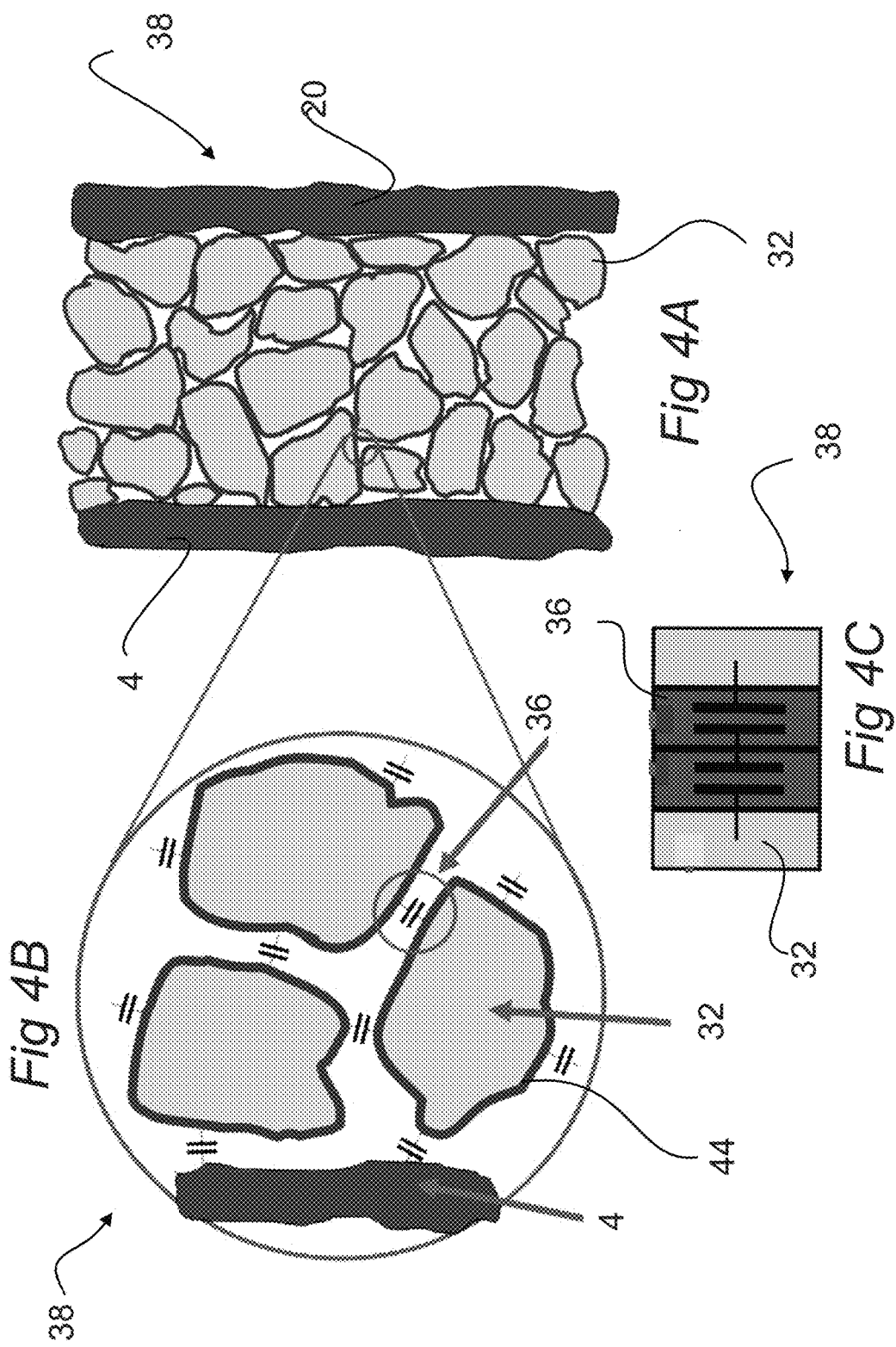

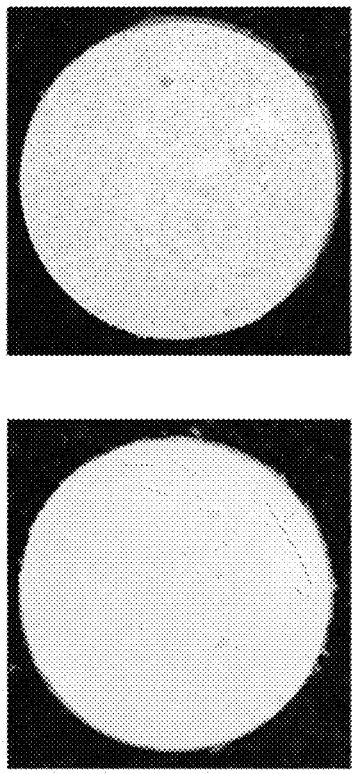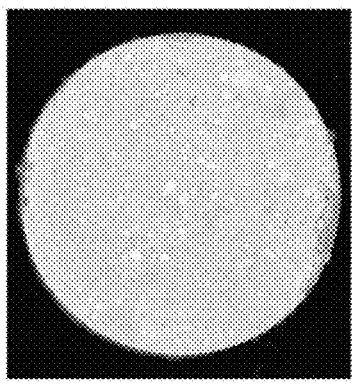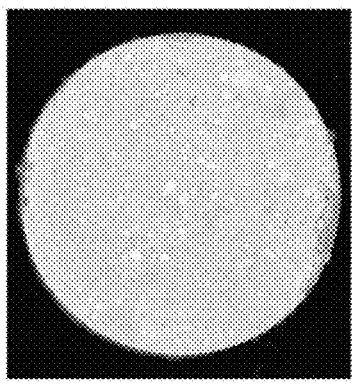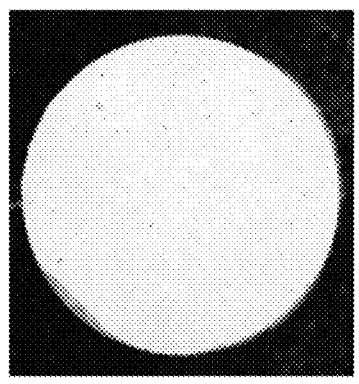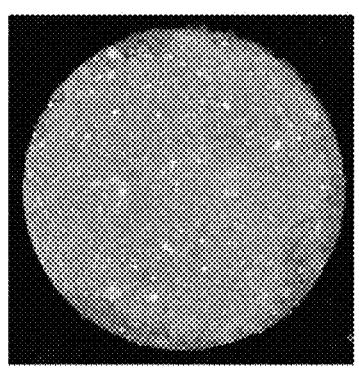

Figure 22A
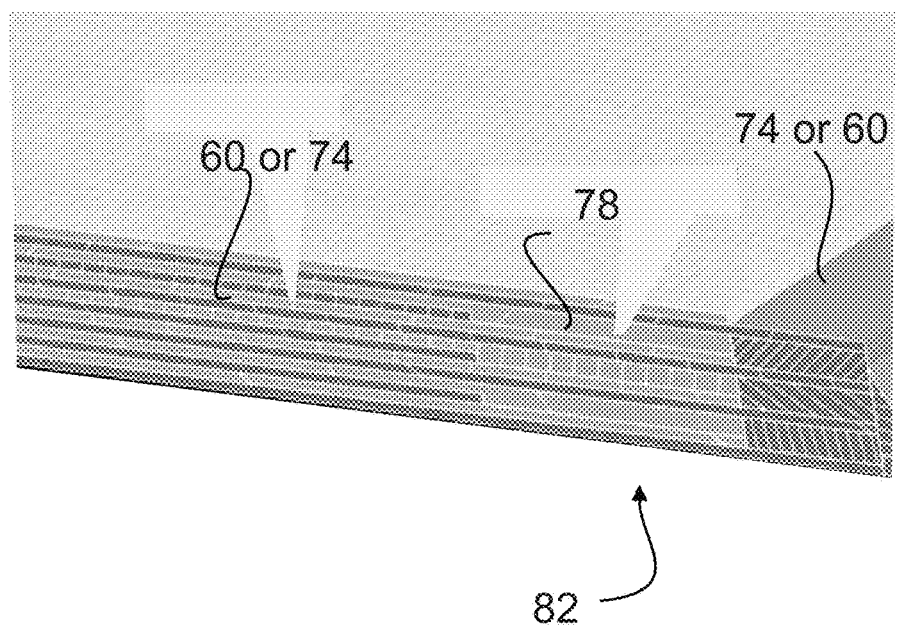
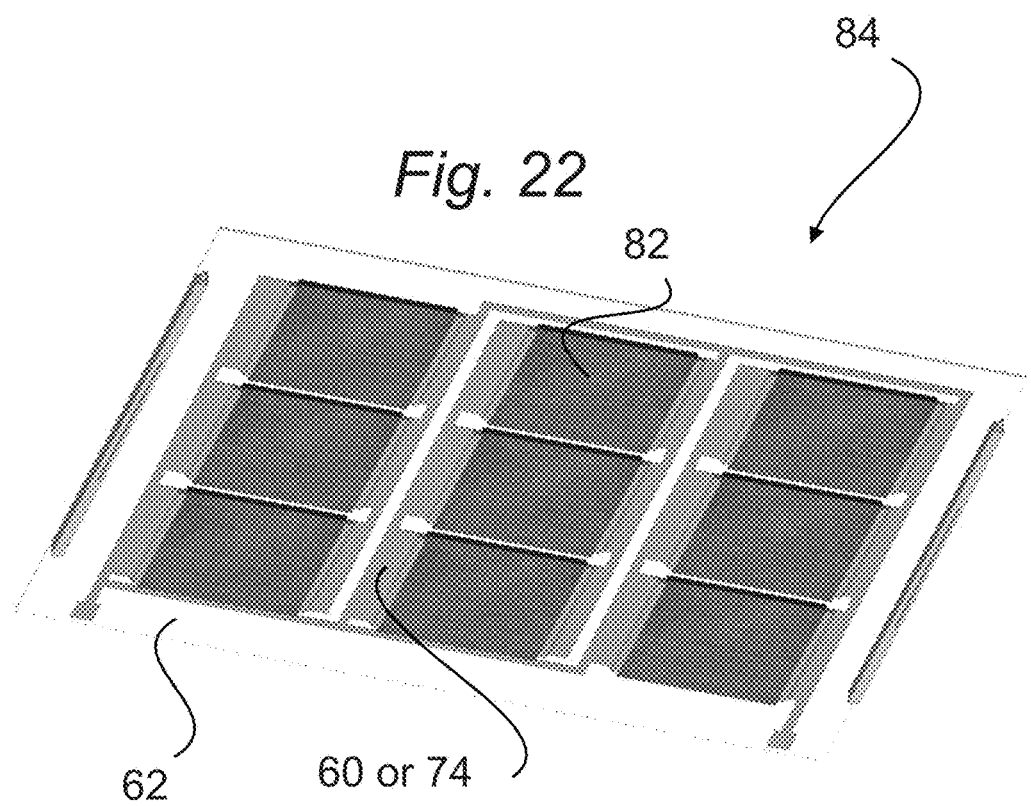
Fig. 22

SOLID STATE ULTRACAPACITOR

STATEMENT REGARDING FEDERALLY SPONSORED RESEARCH OR DEVELOPMENT

The invention described herein was made in the performance of work under a NASA contract and by an employee of the United States Government and is subject to the provisions of Public Law 96-517 (35 U.S.C. §202) and may be manufactured and used by or for the Government for governmental purposes without the payment of any royalties thereon or therefore. In accordance with 35 U.S.C. §202, the contractor elected not to retain title.

BACKGROUND OF THE INVENTION (1) Field of the Invention

The present invention relates to the field of capacitors and more particularly to the field of solid state ultracapacitors.

(2) Description of the Related Art

Electrical, electronic, and electromechanical (EEE) parts are used many products. Better energy storage and delivery devices are currently needed. For example, space vehicles use rechargeable batteries that utilize silver zinc or lithium-ion electrochemical processes. These current state-of-the-art rechargeable batteries cannot be rapidly charged, contain harmful chemicals, and wear out early. A solid-state ultracapacitor is an EEE part that offers significant advantages over current electrochemical and electrolytic devices.

Ultracapacitor behavior has been reported in a number of oxides, including reduced barium titanate ($BaTiO_3$ 40) and ferroelectric ceramics. $BaTiO_3$ 40 is a ceramic material in the perovskite family that possesses a high dielectric constant. Individual coating of ferroelectric $BaTiO_3$ 40 grains with a silica ($SiO_2$ 48) shell, followed by spark plasma sintering (SPS) in reducing conditions, has been shown to lead to stable ultracapacitor behavior. The permittivity values have been reported to be $\approx 10^5$ in electroceramics. It has also been shown that treating oxidized $BaTiO_3$ 40 at high temperatures in reducing forming gas atmosphere (75-96% nitrogen, $N_2$, and 4-25% hydrogen, $H_2$) produces an N-type semiconducting material. The outer coating, which remains an insulating shell, combines with this semiconducting internal layer, resulting in millions of nanocapacitors in parallel. The combination of a semiconducting grain with an insulating boundary leads to the IBLC effect.

These so-called giant ultracapacitor properties are not easily controlled. American Piezo Ceramics International reports a relative dielectric constant of 1,550 and a dielectric dissipation factor (DF) of 0.5 for single-crystal $BaTiO_3$. High permittivity values such as 10,000 are reported in polycrystalline ferroelectric $BaTiO_3$. Reduced $BaTiO_3$ 40 of grain sizes between 70 nm and 300 nm have yielded colossal permittivity values on the order of $\approx 10^5$ The instant invention was developed by evaluating shell-coated $BaTiO_3$ 40 processed under reducing conditions to produce the IBLC effect.

BACKGROUND

List of Acronyms and Symbols

ALD atomic layer deposition
$Al_2O_3$ alumina
$BaTiO_3$ barium titanate
DF dissipation factor
EDLC electrochemical double-layer capacitor
EEE electrical, electronic, and electromechanical
ESR equivalent series resistance
$H_2$ hydrogen
HESSCap high-energy, solid-state capacitor (module)
IBLC internal barrier layer capacitor
LCR inductance, capacitance, and resistance
$N_2$ nitrogen
SCFH standard cubic feet per hour
SEM scanning electron microscope
Si silicon
$SiO_2$ silica
SPS spark plasma sintering
STEM-EDS scanning transmission electron microscopy-energy dispersive spectroscopy
Ti titanium
A electrode surface area
C capacitance
$C_{total}$ total capacitance
D distance between plates
E energy
e electron
f frequency
I current
i imaginary unit
J/cc Joules/cubic centimeter
P power
$P_{max}$ maximum power
Q stored charge
t resistance
t time
tan δ loss tangent delta
V voltage
$V_O$ vacancy site
$V_f$ final voltage
$V_0$ initial voltage
X reactance
Z impedance
$\in_0$ vacuum permittivity
$\in_{eff}$ effective permittivity
$\in_r$ dielectric permittivity Conventional Capacitors A capacitor 6 is an electrical component consisting of two conducting electrodes 4, 20 separated by an insulating dielectric material, typically air 24. When voltage is applied across the capacitor 6, opposite charges accumulate on the surface of each electrode, developing a static electric field. This field causes atoms in the insulator 24 to polarize, producing an internal electric field. Capacitors 6 are able to store energy in this overall electric field. This is illustrated in FIG. 1.

Capacitance (C) is a measure of the ability to store charge, and it is the ratio of the stored charge (Q) to the applied voltage (V):

$$C = \frac{Q}{V} \tag{1}$$

A specific material polarizes in response to an electric field. The vacuum permittivity ($\in_0$) is a constant due to free space vacuum and is $8.854187 \ldots \times 10^{-12}$ F/m. The relative permittivity multiplied by the vacuum permittivity is usually called the effective permittivity ($\in_{eff}$)

$$C = \varepsilon_0 \varepsilon_r \frac{A}{D} \tag{2}$$

Capacitive loads oppose the change of voltage. Impedance (Z) is a measure of the effect of capacitive loads. When reactance (X) is zero, the load is purely resistive; when resistance (R) is zero, the load is purely reactive. Ideal capacitors 6 consist entirely of reactance, having infinite resistance:

$$Z = R + jX \quad (3)$$

and $$X_C = \frac{1}{2\pi fC} \quad (4)$$

Loads are modeled as either a series or parallel combination of a resistive and a reactive load. The parallel resistance is typically larger than the series resistance. To measure small reactive values, such as high-valued capacitors 6, it is preferable to use the series model because the series resistance is more significant than the parallel resistance. When measuring large reactive values such as high-valued inductors or low-valued capacitors 6, it is preferable to use the parallel model. Table 1 shows the capacitance ranges and which model should be used.

TABLE 1

Model for corresponding capacitance ranges.

| | | Type of Measurement | |
|---|---|---|---|
| | Range | Impedance | Model |
| Capacitance | >100 µF | <10 Ω | Series |
| Capacitance | 10 nF to 100 µF | 10 Ω to 10 kΩ | Series or parallel |
| Capacitance | <10 nF | 10 kΩ | Parallel |

At low frequencies, a capacitor 6 is an open circuit, as no current flows in the dielectric. A DC voltage applied across a capacitor 6 causes positive charge to accumulate on one side and negative charge to accumulate on the other side; the electric field due to the accumulated charge is the source of the opposition to the current. When the potential associated with the charge exactly balances the applied voltage, the current goes to zero. Driven by an AC supply, a capacitor 6 will only accumulate a limited amount of charge before the potential difference changes polarity and the charge dissipates. The higher the frequency, the less charge will accumulate, and the smaller the opposition to the current.

The two primary attributes of a capacitor 6 for this invention are its energy density and power density. The energy (E) stored in a capacitor 6 is directly proportional to its capacitance:

$$E = \tfrac{1}{2}CV^2 \quad (5)$$

To determine power, capacitors 6 are represented in series with an external load resistance (R), as shown in FIG. 1. The internal components of the capacitor 6 itself contribute to the resistance as the equivalent series resistance (ESR). Maximum power ($P_{max}$) for a capacitor 6 occurs at matched impedance (R=ESR):

$$P_{max} = \frac{V^2}{4 \times ESR} \quad (6)$$

ESR is an AC resistance dependent on frequency. In nonelectrolytic capacitors 6 such as electroceramics, the resistance of the leads and electrodes and losses in the dielectric cause the ESR. For a capacitor 6, the ESR typically falls between 0.001 and 0.1 Ω and is desired to be low. A high ESR causes increased heat dissipation and results in accelerated aging under high temperature and large ripple current conditions. Additionally, capacitors 6 exhibiting high ESR have a high current leakage, consuming and wasting power in the idle state, making them bad energy storage devices:

$$P = I^2 \times ESR. \quad (7)$$

Electrical potential energy is dissipated in dielectric materials in the form of heat. The DF is a measure of loss rate of energy and is proportional to the ESR. Dissipation factor is also known as loss tangent delta (tan δ), and it is represented as a percentage. This parameter depends on the dielectric material and the frequency of the electrical signals. In high dielectric constant ceramics, DF can be 1%-2%:

$$\tan\delta = \frac{ESR}{|X_C|} = DF \quad (8)$$

Electrical characteristics of ultracapacitors today lie between those of aluminum-electrolytic capacitors and fuel cells. The electrochemical double-layer capacitor 10 (EDLC) (FIGS. 2 A and B) uses high surface area electrodes 4, 20, resulting in ultracapacitor behavior. EDLCs 10 are constructed from two carbon-based electrodes 4, 20, an electrolyte 22, and a separator 26. Ions within the electrolyte solution 22 accumulate at the surface of the electrodes 4, 20 and the separator 26 creates a double-layer of charge. EDLCs 10 generally operate with stable performance characteristics for many charge-discharge cycles, sometimes as many as $10^6$ cycles. On the other hand, electrochemical batteries are generally limited to only about $10^3$ cycles. Because of their cycling stability, EDLCs 10 are well suited for applications that involve nonuser-serviceable locations. Examples include deep sea and mountain environments. However, EDLCs 10 cannot be used in aerospace environments without hermetically sealed containers, which increase mass and volume. Currently, electrolytic ultracapacitors are used primarily in conjunction with batteries in terrestrial environments to capture sudden bursts of energy (e.g., regenerative braking systems). However, electrolytic ultracapacitors do not possess the energy density necessary to replace batteries.

Dielectric tan δ of ceramic capacitors is dependent upon specific characteristics of the dielectric formulation, level of impurities, as well as microstructural factors such as grain size, morphology, porosity and density.

Electrochemical Double-Layer Capacitor

Conventional capacitors have relatively high power densities but low energy densities when compared to electrochemical batteries. Stated another way, a battery may store more energy but cannot deliver it as quickly as a capacitor can. Current ultracapacitors exploit high surface area electrodes and thin dielectrics to increase both capacitance and energy. Additionally, ultracapacitors have advantages over electrochemical batteries and fuel cells, including higher power density, shorter charging times, longer cycle life and longer shelf life. The Ragone chart in FIG. 3 compares the power and energy densities of different types of current energy storage devices.

Internal Barrier Layer Capacitor

A solid-state ultracapacitor would overcome the limits of both the electrochemical batteries presently being used and of currently available electrochemical ultracapacitors.

Solid-state ultracapacitors provide a robust energy storage device with higher reliability, less weight and less volume than electrochemical batteries and electrolytic ultracapacitors. They are recyclable energy storage devices that offer higher power and a greater number of charge/discharge cycles than current rechargeable batteries. They also offer greater breakdown voltage than current electrolytic ultracapacitors. The instant invention is a high-energy, solid-state capacitor (HESSCap) module to replace batteries and current state-of-the-art ultracapacitors. Table 2 presents the primary parameters for aerospace batteries, terrestrial electrolytic ultracapacitors, and the target values for the HESSCap.

TABLE 2

Ultracapacitor/battery comparison.

| Device | Energy Density (J/cc) | Charge/Discharge Cycles | Voltage (V) |
| --- | --- | --- | --- |
| Aerospace battery (Li-ion) | 172 | 500-2,000 | 28 |
| Aerospace range safety battery (Ag Zn) | 57 | <12 | 28 |
| Commercial electrolytic ultracapacitor | 15 | >500 with 50% V and 25% C decrease | 59 |
| ES43 solid-state module (28 V) | 80-200 | >500,000 | 28 |

The HESSCap module achieves high permittivity via the IBLC effect, shown in FIGS. 4A, B and C, individual ferroelectric grains are coated by a dielectric shell, followed by sintering at high temperatures under reducing forming gas atmosphere (96% $N_2$ and 4% $H_2$). The forming gas penetrates the shell and reacts with the inner grain, making each grain semiconductive. The coating serves as an insulator, resulting in millions of nanocapacitors in parallel:

$$C_{total} = C_1 + C_2 + \ldots + C_n \quad (9)$$

The two main parameters for the internal barrier layer to increase the overall dielectric permittivity of oxides are (1) the inner grain conductivity and (2) the insulating grain boundary. The former is related to the amount of charged defects intentionally formed during the sintering step under reducing conditions. The IBLC model can be applied to any material where extended dielectric interfaces of very small thickness separate (semi)conducting parts: in ceramics, insulating grain boundaries surround conducting grains; in thin films and multilayers, surfaces and intergrowth planes can induce dielectric barriers between conducting layers. However, the exact nature of the conduction mechanism within the grains and of the charge accumulation at the grain boundaries is not well understood.

In *Appl. Phys. Lett.*, Vol. 94, No. 7, 3 pp., doi: 10.1063/1.3076125, February 2009, Chung, U.-C.; Elissalde, C.; Mornet, S.; et al. (hereafter Chung) disclose controlling the internal barrier in low loss $BaTiO_3$ supercapacitors.

Chung discloses "standard $BaTiO_3$ particles of 500 nm diameter" that "have been individually coated with a homogeneous amorphous silica shell of 5 nm thickness using a method derived from the Stöber process." However, the instant invention utilizes a proprietary gas-phase chemical process rather than the Stöber process. Chung also discloses sintering in a "reducing atmosphere at a final temperature of 1100° C. under vacuum".

Chung further states that the density of the pressed pellets was 97%. Chung states that "the room temperature dielectric permittivity is in the range of the so called giant dielectric materials ($\in\sim2.105$ at $f=10^4$ Hz) meaning that our core shell particles are indeed leading to IBLC ceramics (FIG. 2a)."

Chung reports that the dielectric losses of the material are on the order 5% at $10^4$ Hz "instead of 100% in the existing literature". The $BaTiO_3$ particle size and thickness of the silica shell of Chung are identical to the particle size and coating thicknesses for $SiO_2$ for the instant invention. However, Chung does not disclose a capacitor fabricated utilizing the disclosed IBLC ceramic material. Also, Chung does not disclose the proprietary coating process utilized in this invention. Further, the (Chung sintering temperature 1100° C.) is somewhat higher than the 850-900° C. temperature utilized to fabricate the capacitors in accordance with the instant invention.

Reynolds et al. U.S. Patent Publication No. 2014/0022694 (hereafter Reynolds), discloses a method for manufacturing multi-layer ceramic capacitors. At paragraph [0058], Reynolds discloses a method including forming a bottom electrode on a substrate utilizing "thick film methods such as screen printing or tape casting" or "thin-film techniques including but not limited to sputtering, evaporation, ion plating, post laser deposition, atomic layer deposition, chemical vapor deposition, plasma-enhanced chemical vapor deposition, electroplating and electroless plating."

At paragraph [0060], Reynolds states that the ceramic dielectric is deposited following deposition of the bottom electrode which "can be by thick film techniques such as screen printing or tape casting." Reynolds states that thin-film techniques can also be utilized to deposit the ceramic dielectric. At paragraph [0060], Reynolds discloses a post-deposition heat treatment of the ceramic dielectrics such as "a high temperature firing in vacuum or in a reducing environment to remove the organic and volatile compounds of the inks and binders used, for example, in the screen printing process and also to form the desired crystal and grain structures for high-k materials such as doped barium titanates that must be converted to their perovskite phase."

At paragraph [0061], Reynolds states that the ceramic is then coated with a thin film "such as silicon nitride ($SiN_x$), silicone dioxide ($SiO_2$), aluminum oxide ($Al_2O_3$), etc." Reynolds states that the films "will probably have thicknesses > to 5 nm" but "they can be even thinner." Suitable deposition techniques "include sol-gel deposition, sputtering, evaporation, ion plating, pulse laser deposition, atomic layer deposition, plasma-enhanced chemical vapor deposition, 'electrografting' and especially chemical vapor deposition."

At paragraph [0061], Reynolds also states that "atmospheric CVD is again preferred because thermal CVD is able to penetrate into very small spaces, even between the gaps of the individual high-k grains. In this way, an internal barrier-layer type capacitor dielectric is formed with a large capacitance but with reduced leakage and increased dielectric breakdown strength."

At paragraph [0062], Reynolds states that the substrates can be introduced into a multi-zone furnace having a first high temperature zone incorporating a reducing ambient. The stack is then allowed to cool, and a second layer of metal electrode material is deposited, and a second layer of high-k ceramic is then deposited onto the second metal electrode (paragraphs [0063]-[0064]).

However, in the instant invention the particles used to formulate the dielectric ink are coated with a proprietary gas-phase chemical process. In contrast, Reynolds states that an internal barrier-type capacitor dielectric can be formed by utilizing a CVD process to coat barium particles (e.g. barium titanate 40) after the particles are deposited using an ink and screen printing technique. This results in only an upper layer of particle coating whereas inner particles are not coated.

Development of a capacitor for replacing batteries which can provide longer life, lower mass-to-weight ratio, rapid charging, on-demand pulse power, improved standby time without maintenance, and environmental friendliness represents a great improvement in the field of electronics and satisfies a long felt need of engineers and manufacturers.

SUMMARY OF THE INVENTION

The present invention is a novel method for forming solid state ultracapacitors, utilizing internal barrier layer capacitor (IBLC) material. IBLC materials generally include electrically conductive grains that are coated by an insulating material. Ferroelectric grains may be coated by a dielectric shell, followed by sintering at high temperatures in a reducing forming gas atmosphere (96% $N_2$ and 4% $H_2$). The forming gas penetrates the shell and reacts with the inner grain, making each grain semiconductive. The coating serves as an insulator, resulting in millions of nanocapacitors in parallel.

The instant invention is a method of manufacturing a capacitor. Particles of $BaTiO_3$ having an average grain diameter of 100-700 nm are first heated in a furnace under a mixture of 70-96% by volume $N_2$ 4-30% by volume $H_2$ gas for 60-90 minutes at 900° C.

The first furnace may be a multizone belt furnace or a fluidized bed vertical tube furnace. The second furnace may be a multizone belt furnace.

Next a 3-20 nm film of $SiO_2$ or $Al_2O_3$ is deposited over the particles. The resulting material is agglomerated so the coated particles must be mechanically separated. The particles are then incorporated into an ink of the following formulation:
  i. 60-80% by weight separated, coated, treated ceramic particles;
  ii. 5-50% by weight high dielectric constant glass; the high dielectric constant glass being 0.5-10 µm in size;
  iii. 0.1-5% by weight surfactant;
  iv. 5-25% by weight solvent; and
  v. 5-25% weight organic vehicle.

Next a layer of the dielectric ink is deposited on a substrate with a pre-sintered and deposited electrode in place. Methods of depositing electrodes on a substrate are well known in the field of capacitor manufacture. The electrode can be silver, silver palladium, or any material with a resistance between 1 milliohm and 10 ohms. Finally, the dielectric ink is sintered onto the substrate by heating in a second furnace at 850-900° C. for 60-90 minutes and allowing the ink and substrate to cool to ambient. This heating and cooling cycle is carried out under $N_2$ atmosphere, which contains less than 25 ppm O2. Preferably, during sintering, the time under 600° C. is kept to 30 minutes maximum; time under 800° C. is 20 minutes maximum; and total time is 60-90 minutes. Also, preferably, the heating rate is 45-55° C./minute from 300-500° C.; and the cooling rate is 45-55° C./minute from 700-300° C. Once the dielectric is sintered, a top electrode is added that can be silver, silver palladium or any material with a resistance between 1 milliohm and 10 ohms.

The substrate is preferably 0.025-0.040 inch thick $Al_2O_3$ in which the $Al_2O_3$ is at least 96% pure. Alternatively, the substrate could be aluminum nitride (AlN) zirconia, beryllium oxide (BeO) or uncured ceramic. Uncured ceramic is a mixture of ceramic particles, a binder, a surfactant and a solvent. Formulae for uncured ceramic are well known.

Preferably the thickness of the deposited dielectric ink is sufficient to produce a sintered layer 10-35 µm thick.

This invention is also an ink of the following formulation:
  a. 60-80% by weight $BaTiO_3$ particles coated with a 3-20 nm film of $SiO_2$ or $Al_2O_3$; the $BaTiO_3$ particles having an average grain diameter of 100-700 nm; the $BaTiO_3$ having doubly ionized oxygen anion vacancies;
  b. 5-50% by weight high dielectric constant glass; the high dielectric constant glass being 1-10 µm in size;
  c. 0.1-5% by weight surfactant;
  d. 5-25% by weight solvent; and
  e. 5-25% weight organic vehicle;

The solvent may be ester alcohol, terpineol or butyl carbitol, and the organic vehicle may be ethyl cellulose. The high dielectric constant glass may be lead-germinate or zinc borate glass. Preferably, the surfactant is a phosphate ester.

The process of the instant invention results in an internal barrier layer ultracapacitor (IBLC) made from novel dielectric materials as a battery replacement with the following advantages: longer life, lower mass-to-weight ratio, rapid charging, on-demand pulse power, improved standby time without maintenance, and environmental friendliness.

Test pellets were fabricated utilizing $BaTiO_3$ particles of 730 and 500 nm particle sizes. Some of the test pellets were made with $BaTiO_3$ particles that were coated with $SiO_2$, and test pellets were fabricated utilizing $BaTiO_3$ particles (500 nm) that were coated with $Al_2O_3$. The $SiO_2$ coating thickness was 5 nm, and the $Al_2O_3$ thickness was 10 nm.

$BaTiO_3$ particles were coated using an atomic layer deposition (ALD) process. Atomic Layer Deposition (ALD) is a thin film deposition method in which a film is grown on a substrate by exposing its surface to alternate gaseous species (typically referred to as precursors). In contrast to chemical vapor deposition (CVD), the precursors are never present simultaneously in the reactor, but they are inserted as a series of sequential, non-overlapping pulses. In each of these pulses the precursor molecules react with the surface in a self-limiting way, so that the reaction terminates once all the reactive sites on the surface are consumed. Consequently, the maximum amount of material deposited on the surface after a single exposure to all of the precursors (a so-called ALD cycle) is determined by the nature of the precursor-surface interaction. See Puurunen, Riikka, Surface chemistry of atomic layer deposition: A case study for the trimethylaluminum/water process, Journal of Applied Physics 97, 121301 (2005).

By varying the number of cycles it is possible to grow materials uniformly and with high precision on arbitrarily complex and large substrates. The un-sintered particles were pressed into pellets without the addition of binder using a potassium bromide dye, and a tube furnace was used to heat the pellets under an atmosphere of 96% $N_2$ and 4% $H_2$. In such an atmosphere, $BaTiO_3$ is slightly reduced. Quartz boats were each populated with pellets of $Al_2O_3$-coated, $SiO_2$-coated, and uncoated $BaTiO_3$. After processing and the pellets were left to cool to room temperature inside the tube furnace. Resulting pellets were 4-8 mm thick with masses of 1.5-2.5 g.

Capacitors can also be made by 3D additive manufacturing. To perform 3D additive manufacturing, the particles are first converted into an ink. Two additive manufacturing techniques used for electrode and dielectric deposition, such as aerosol jet deposition and screen printing, require unfused particles in order to deposit the material properly. In order to deposit the particles, they are separated using a three-roll mill or similar machine.

The aerosol jet process begins with a mist generator that atomizes a source material. Particles in the resulting aerosol stream are then condensed. The aerosol stream is then aerodynamically focused using a flow guidance deposition head, which creates an annular flow of sheath gas to collimate the aerosol. The co-axial flow exits the flow guidance head through a nozzle directed at the substrate, which serves to focus the material stream to as small as a tenth of the size of the nozzle orifice (typically 100 µm).

The aerosol jet process allows for a large viscosity range of processible inks (typically 0.7-2,500 cP), a flexible distance between substrate and nozzle (typically 1 to 5 mm) as well as a tightly focused aerosol stream for variable line width. This allows the production of fine pitch (typically below 50 µm) electronic devices. Machines for performing this process are available from Optomec, Inc., New Mexico; under the brand name Aerosol Jet®.

Screen printing is the process of using a mesh-based stencil to apply ink onto a substrate, whether it be T-shirts, posters, stickers, vinyl, wood, or other material.

Some areas of the mesh are made impermeable and the mesh placed over the substrate. A blade or squeegee is used to move ink across the screen to fill the open mesh apertures with ink. A reverse stroke then causes the screen to touch the substrate momentarily along a line of contact. This causes the ink to wet the substrate and be pulled out of the mesh apertures as the screen springs back after the blade has passed.

Screen printing was utilized to fabricate test cells. The capacitor test cells were sintered using a belt furnace after each layer deposition. Subsequent testing showed energy densities in the range of 1.0 to 2.0 J/cc.

An appreciation of the other aims and objectives of the present invention and an understanding of it may be achieved by referring to the accompanying drawings and description of a preferred embodiment.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 13B Optical microscopy photograph of $SiO_2$ coated $BaTiO_3$ pellets treated at 900° C. for 1 hr.
FIG. 13C Optical microscopy photographs of $Al_2O_3$ coated $BaTiO_3$ pellets treated at 900° C. for 1 hr.
FIG. 14A Optical microscopy photographs of uncoated, $BaTiO_3$ pellets treated at 1,100° C. for 1 hr.
FIG. 14B Optical microscopy photographs of $SiO_2$ coated $BaTiO_3$ pellets treated at 1,100° C. for 1 hr.
FIG. 14C Optical microscopy photographs of $Al_2O_3$ coated $BaTiO_3$ pellets treated at 1,100° C. for 1 hr.

FIG. 22A is a cross section of a multilayer capacitor cell, nine of which are used in a slice.

DETAILED DESCRIPTION OF THE PREFERRED EMBODIMENT

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

The instant invention is a method of manufacturing an IBLC capacitor 38. Particles of $BaTiO_3$ 40 (see FIGS. 4, 5 and 6) having an average grain diameter of 100-700 nm are first heated in a furnace under a mixture of 70-96% by volume $N_2$ 4-30% by volume $H_2$ gas for 60-90 minutes at 850-900° C.

Figure 6:
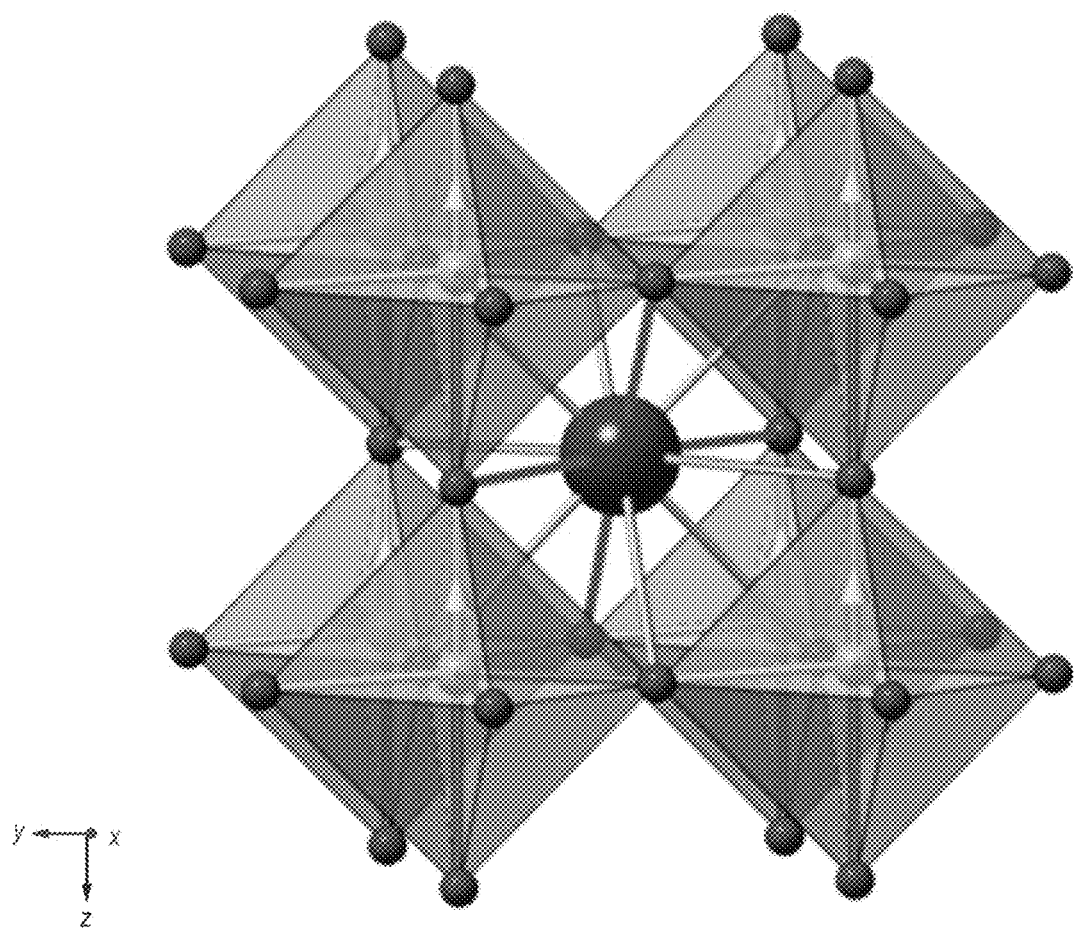

$BaTiO_3$ has doubly ionized oxygen anion vacancies—see FIG. 6. The first furnace may be a multizone belt furnace or a fluidized bed vertical tube furnace. The second furnace may be a multizone belt furnace.

Next a 3-10 nm film of $SiO_2$ 48 or $Al_2O_3$ 44 is deposited over each individual particle 40. The resulting grains 32 (see FIGS. 5A and 5B) are agglomerated so they must be mechanically separated. The grains are then incorporated into an ink of the following formulation:
  i. 60-80% by weight separated grains 32;
  ii. 5-50% by weight high dielectric constant glass; the high dielectric constant glass being 1-10 μm in size
  iii. 0.1-5% by weight surfactant;
  iv. 5-25% by weight solvent; and
  v. 5-25% weight organic vehicle.

The solvent may be ester alcohol, terpineol or butyl carbitol, and the organic vehicle may be ethyl cellulose. The high dielectric constant glass may be lead-germinate or zinc borate glass. Preferably, the surfactant is a phosphate ester.

Next a layer of the dielectric ink 24a is deposited on a substrate 62 with a pre-sintered and deposited electrode 60 in place. The electrode can be silver, silver palladium, or any material with a resistance between 1 milliohm and 10 ohms. Finally, the dielectric ink 24a is sintered onto the substrate 62 by heating in a second furnace at 850-900° C. for less than 5 minutes and allowing the ink 24a and substrate 62 to cool to ambient. This heating and cooling cycle is carried out under $N_2$ atmosphere, which contains less than 25 ppm 02. Preferably, during sintering, the time under 600° C. is kept to 30 minutes maximum; time under 800° C. is 20 minutes maximum; and total time is 60-90 minutes. Also, preferably, the heating rate is 45-55° C./minute from 300-500° C.; and the cooling rate is 45-55° C./minute from 700-300° C. Once the dielectric is sintered, a top electrode 74 is added that can be silver, silver palladium or any material with a resistance between 1 milliohm and 10 ohms.

The substrate 62 is preferably 0.025-0.040 inch thick $Al_2O_3$ in which the $Al_2O_3$ is at least 96% pure. Alternatively, the substrate could be aluminum nitride (AlN) zirconia, beryllium oxide (BeO) or uncured ceramic. Uncured ceramic is a mixture of ceramic particles, a binder, a surfactant and a solvent.

Preferably, the thickness of the deposited dielectric ink 24a is sufficient to produce a sintered layer 10-35 μm thick.

The process of the instant invention results in an internal barrier layer ultracapacitor (IBLC) 38, which can be used as a battery replacement because it has the following advantages: longer life, lower mass-to-weight ratio, rapid charging, on-demand pulse power, improved standby time without maintenance, and environmental friendliness.

This invention is also an ink of the formula shown above.

Experimental I

Test pellets were fabricated utilizing $BaTiO_3$ particles 40 of 730 and 500 nm particle sizes. Some of the test pellets were made with $BaTiO_3$ particles 40 that were coated with $SiO_2$ 48, and test pellets were fabricated utilizing $BaTiO_3$ particles 40 (500 nm) that were coated with $Al_2O_3$ 44. The $SiO_2$ coating 48 thickness was 5 nm, and the $Al_2O_3$ 44 thickness was 10 nm.

$BaTiO_3$ particles 40 were coated using an atomic layer deposition (ALD) process.

Some un-sintered particles were pressed into pellets without the addition of binder using a potassium bromide dye. A tube furnace was used to heat the pellets under an atmosphere of 96% $N_2$ and 4% $H_2$. In such an atmosphere, $BaTiO_3$ 40 is slightly reduced. Quartz boats were each populated with pellets of $Al_2O_3$-coated, $SiO_2$-coated, and uncoated $BaTiO_3$ 40. After processing the pellets were left to cool to room temperature inside the tube furnace. Resulting pellets were 4-8 mm thick with masses of 1.5-2.5 g.

Capacitors can also be made by 3D additive manufacturing. To perform 3D additive manufacturing, the particles are first converted into an ink. Two additive manufacturing techniques can be used for dielectric 78 deposition, such as aerosol jet deposition and screen printing. They require unfused particles in order to deposit properly. In order to screen print the particles, they are separated using a three-roll mill or similar machine.

The aerosol jet process begins with a mist generator that atomizes a source material. Particles in the resulting aerosol stream are condensed. The aerosol stream is then aerodynamically focused using a flow guidance deposition head, which creates an annular flow of sheath gas to collimate the aerosol. The co-axial flow exits the flow guidance head through a nozzle directed at the substrate, which serves to focus the material stream to as small as a tenth of the size of the nozzle orifice (typically 100 μm).

The aerosol jet process allows for a large viscosity range of processible inks (typically 0.7-2,500 cP), a flexible distance between substrate and nozzle (typically 1 to 5 mm) as well as a tightly focused aerosol stream for variable line width. This allows the production of fine pitch (typically below 50 μm) electronic devices. Machines for performing this process are available from Optomec, Inc., New Mexico; under the brand name Aerosol Jet®.

Screen printing is the process of using a mesh-based stencil to apply ink onto a substrate, whether it be T-shirts, posters, stickers, vinyl, wood, or other material.

Some areas of the mesh are made impermeable and the mesh placed over the substrate. A blade or squeegee is used to move ink across the screen to fill the open mesh apertures with ink. A reverse stroke then causes the screen to touch the substrate momentarily along a line of contact. This causes the ink to wet the substrate and be pulled out of the mesh apertures as the screen springs back after the blade has passed.

Screen printing was utilized to fabricate test cells. The capacitor 38 test cells were sintered using a belt furnace after deposition of each layer. Subsequent testing showed energy densities in the range of 1.0 to 2.0 J/cc.

Atomic Layer Deposition-Coated Ceramic Barium Titanate Particles 40

A prior study focused on $BaTiO_3$ particles 40 of various sizes in both coated and uncoated configurations, with the latter serving as a baseline. Table 3 provides the details on particle diameter, coating material and thickness, purity, and supplier.

TABLE 3

Materials.

| Material | Supplier | Particle Size (nm) | Purity (%) | Coating | Thickness (nm) | Color |
|---|---|---|---|---|---|---|
| $BaTiO_3$ 40 | Ferro | 730 | 99.95 | Uncoated | — | White |
| $BaTiO_3$ 40 | TPL | 500 | 99.95 | $SiO_3$ | 5 | Light grey |
| $BaTiO_3$ 40 | ALD Nano-Solutions | 500 | 99.95 | $Al_2O_3$ | 10 | White |
| $BaTiO_3$ 40 | Sakai | 140 | 99.95 | uncoated | — | white |

The $BaTiO_3$ particles 40 used in this study varied in diameters ranging from 140 nm to 730 nm as their D50, or median particle size. Coating configurations varied from uncoated to 10 nm. The uncoated $BaTiO_3$ 40 sample was a fine powder, while the coated $BaTiO_3$ 40 samples were agglomerated. The clumps are likely caused by hydrophilic interaction or static charge. The clumps were dispersed before processing into ink formulations.

Figure 1:
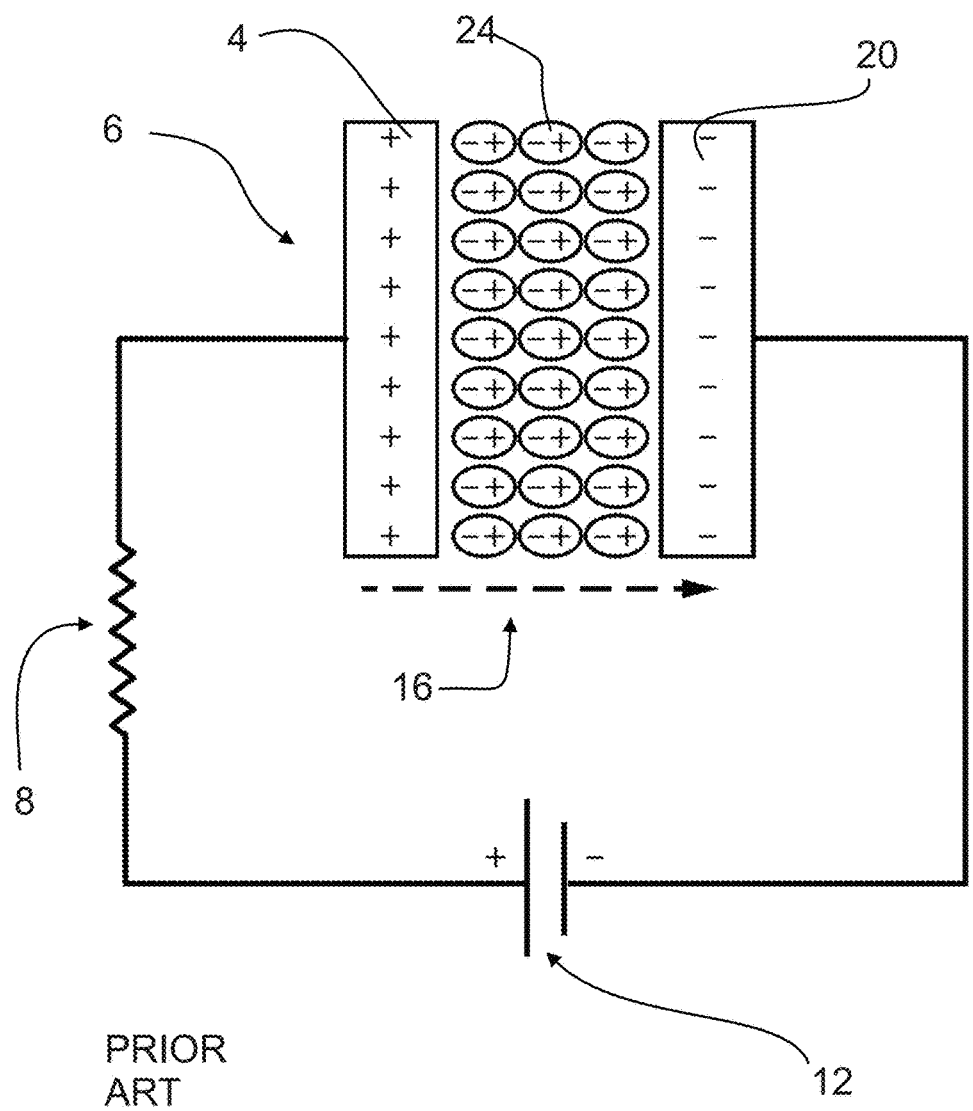
FIG. 1 Schematic of a conventional capacitor
FIG. 2A Schematic of an EDLC
FIG. 2B Enlargement of area marked with a B on FIG. 2A
FIG. 3 Ragone chart of energy storage devices
FIG. 4A Internal barrier layer capacitor
FIG. 4B Enlargement of area identified on FIG. 4A
FIG. 4C Internal barrier layer capacitor effect
FIG. 5A $BaTiO_3$ particle with 10 nm of $Al_2O_3$ coating.
Figure 2A:
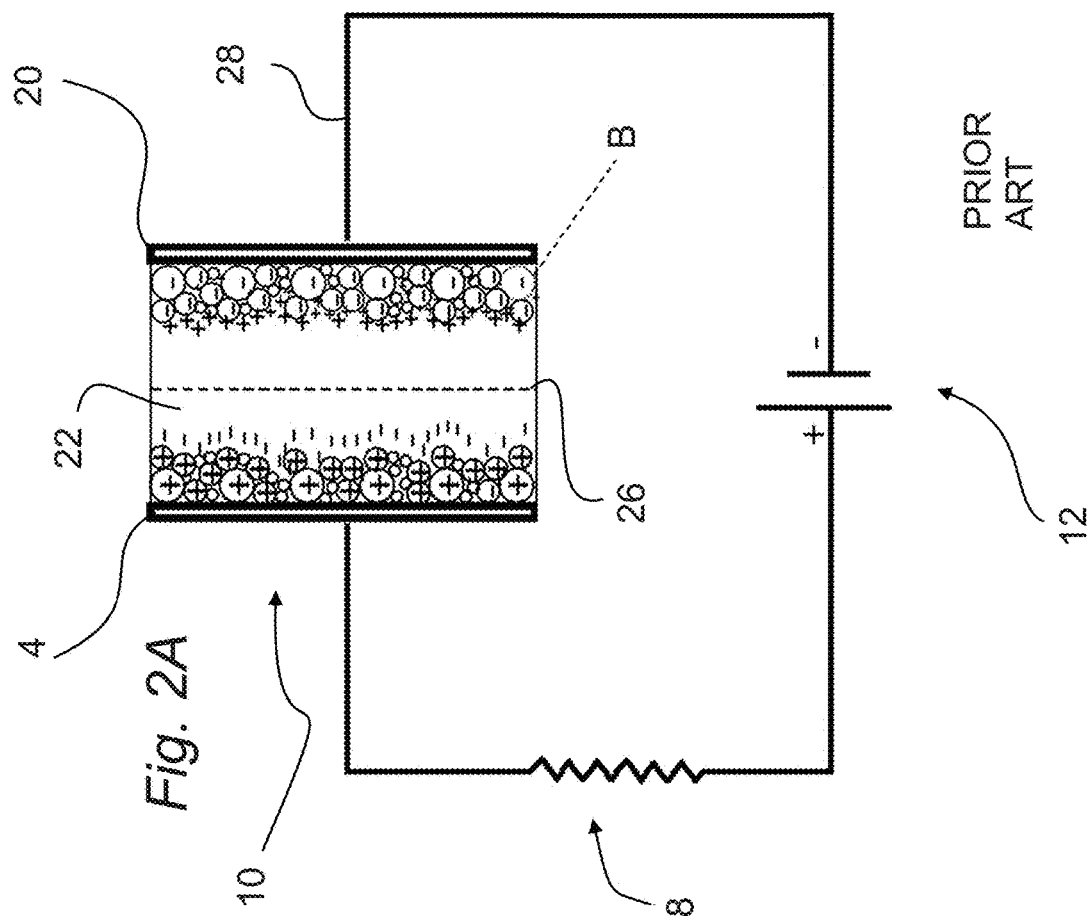
Figure 2B:
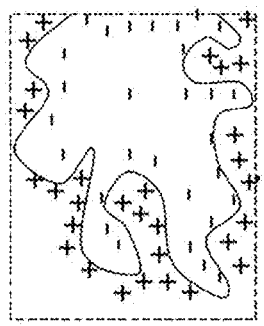
Figure 3:
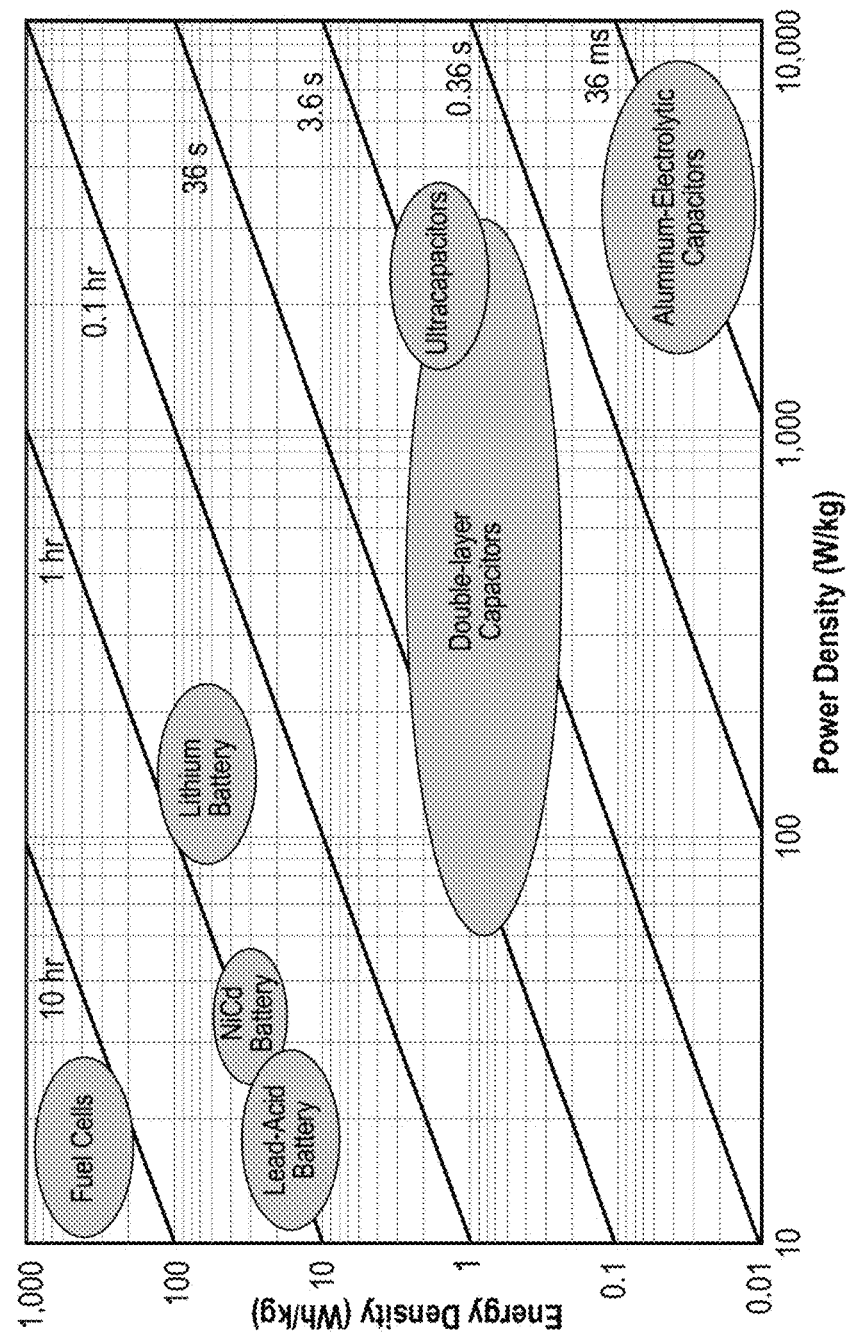
Figure 5A:
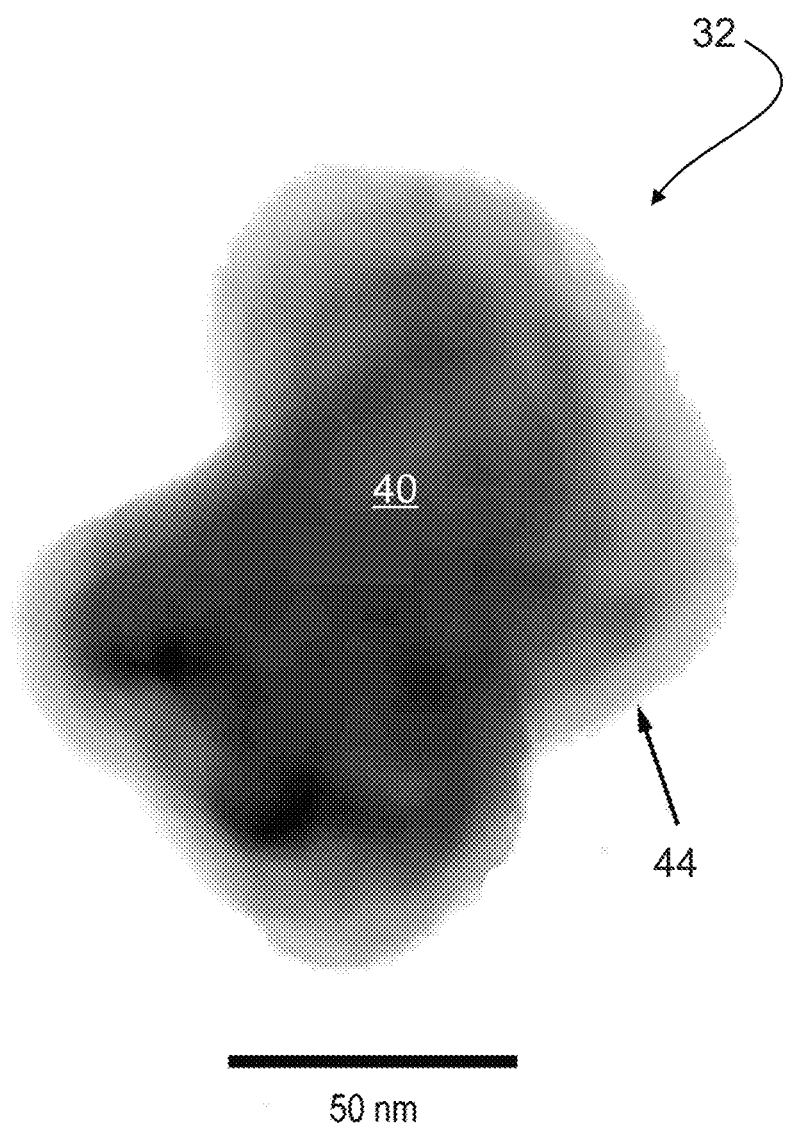
FIG. 5B $BaTiO_3$ particle with $SiO_2$ coating
FIG. 6 The $BaTiO_3$ crystal structure. The green, red, and blue atoms are titanium, oxygen, and barium, respectively
FIG. 7 Dielectric Test Fixture 1645-1B in front of Agilent E4980A precision LRC meter.
Figure 5B:
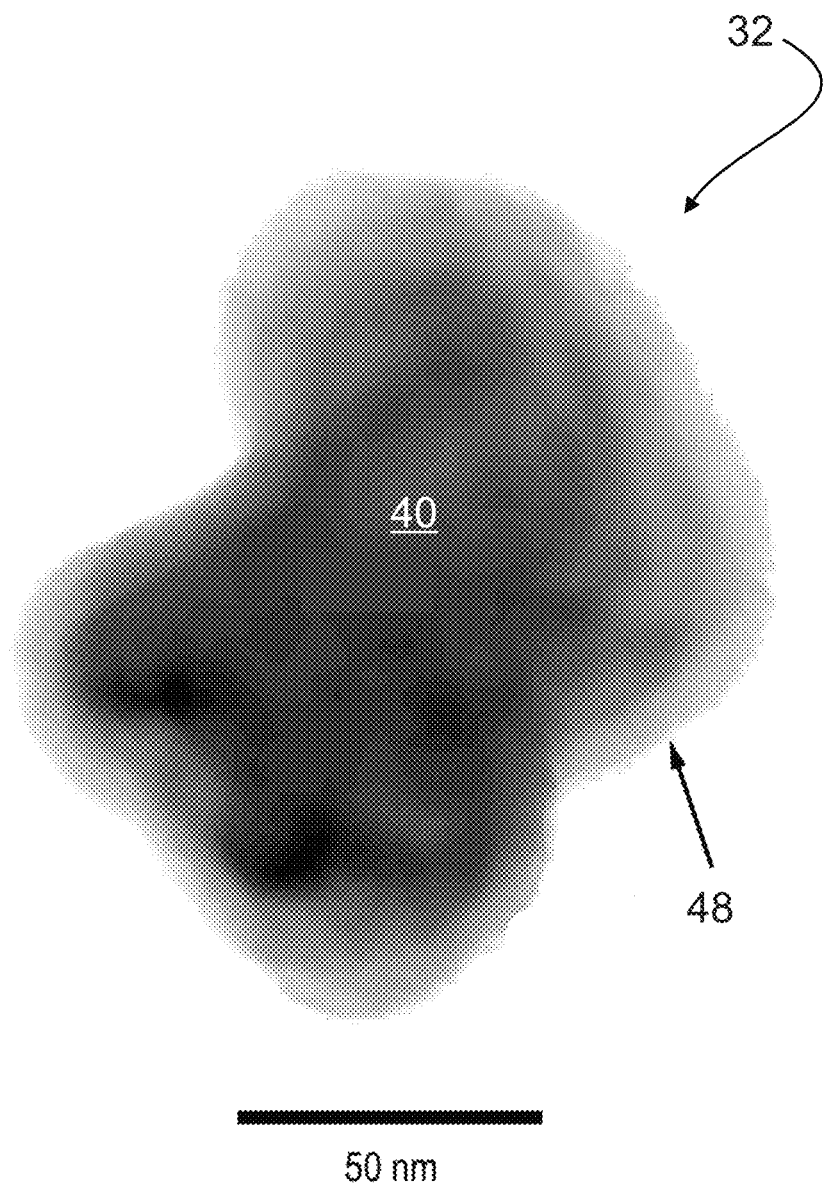

Atomic layer deposition (ALD) was used to deposit nanothin films over $BaTiO_3$ nanoparticles. The nanothin film coatings consist of a 10 nm thick layer of alumina ($Al_2O_3$ 44) and 5 nm thick layer of silica ($SiO_2$ 48). FIG. 5A illustrates a $BaTiO_3$ particle 40 coated with $Al_2O_3$ 44. FIG. 5B illustrates a $BaTiO_3$ particle 40 coated with $SiO_2$ 48. The number of cycles performed during ALD determines the coating thickness. The coating thickness rate for $Al_2O_3$ 44 was 10 Å per cycle, and for $SiO_2$ 48 was 4 Å per cycle. It is important to note that previous IBLC research using SPS of $BaTiO_3$ particles 40 were coated by the Stöber process, a method based on a seeded growth process. The Stöber process is known to produce an inconsistent coating.

High-Temperature and Reduced Forming Gas Sintering

In reducing atmospheres (75-96% $N_2$ and 4-25% $H_2$), $BaTiO_3$ 40 is slightly reduced, forming doubly ionized oxygen (anion) vacancies. This produces the same effect as vacuum sintering, so a reducing atmosphere is the preferred method of processing. To understand vacancy creation, $BaTiO_3$ 40 crystal structure is shown in FIG. 6. The conductivity results from the electron exchange between $Ti^{+4}$ and $Ti^{+3}$ resulting from oxygen vacancies at the octahedron. The induced free electrons make the reduced perovskite material highly semiconducting as shown in equations (10) and (11). Sintering $BaTiO_3$-based dielectrics in forming gas decreases the insulation resistance by 10-12 orders of magnitude. FIG. 6 shows the $BaTiO_3$ crystal structure.

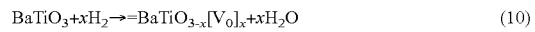

$$BaTiO_3 + xH_2 \rightarrow = BaTiO_{3-x}[V_0]_x + xH_2O \quad (10)$$

and

$$[V_0] \rightarrow = [V_0]^- + 2e \quad (11)$$

A three-zone, Thermo Scientific™ Lindberg/Blue tube furnace was used to process the particles. The furnace was heated to 850-950° C. for at least 60 minutes. The uncoated $BaTiO_3$ 40, serving as a baseline, was always heat treated to evaluate its electrical properties versus those of coated particles. The forming gas was turned on at 1-3 SCFH for 10 min. prior to placing the samples inside. After the desired annealing duration, the forming gas was left flowing until the powder reached a temperature under 300° C. to avoid any reoxidation of the powder. The samples were left to cool to room temperature inside the tube furnace before removal.

Previous studies show that the reduction of $BaTiO_3$ 40 in $H_2$ at intermediate temperatures (500° C.) leads to bodies of bright yellow color. Reduced $SiO_2$-coated material obtained through SPS at a final temperature of 1,110° C. is expected to change from white to a navy blue color. Uncoated $BaTiO_3$ 40 and doped $BaTiO_3$ specimens that show a remarkable reduction in resistivity has also been characterized with a bluish color. To assess color changes, optical microscopy images of the pellets were taken at ×7 magnification.

When powdered particles 32 are heated to a high temperature below the melting point, the atoms in the particles diffuse across the particle boundaries, fusing the particles together. Two additive manufacturing techniques used for electrode and dielectric deposition, such as aerosol jet deposition and screen printing, require unfused particles in order to deposit the material properly.

In order to screen print the particles, they were separated using a three-roll mill.

Pellet Electrical Characterization

Un-sintered $BaTiO_3$ particles 40 were pressed into pellets without the addition of binder using a potassium bromide die. A literature review revealed that pellets pressed at pressures above 345 MPa (50,000 psi) could not be recovered. Various pressures were tested, revealing that pellets pressed at forces above 1.8 kN (400 lb.) could not be recovered from the potassium bromide die in suitable shape. Because of these findings, the pellets were made by pressing them at 1.3 kN (300 lb.) of force using a TestResources (Shakopee, Minn.) compression and tension machine. The pellets were 4-8 mm thick with masses of 1.5-2.5 g.

Adsorption of water vapor increases the permittivity by a factor of 2.19 However, the focus of the characterization at this phase of the study was to identify a sample with a large change in permittivity, specifically by a factor of $10^4$. Because the focus was large changes in permittivity, no attempt was made to remove water. In addition, thin film electrical characterization is used to obtain the most accurate measurements, and since these samples are sintered, water absorption effects are eliminated.

Figure 7:
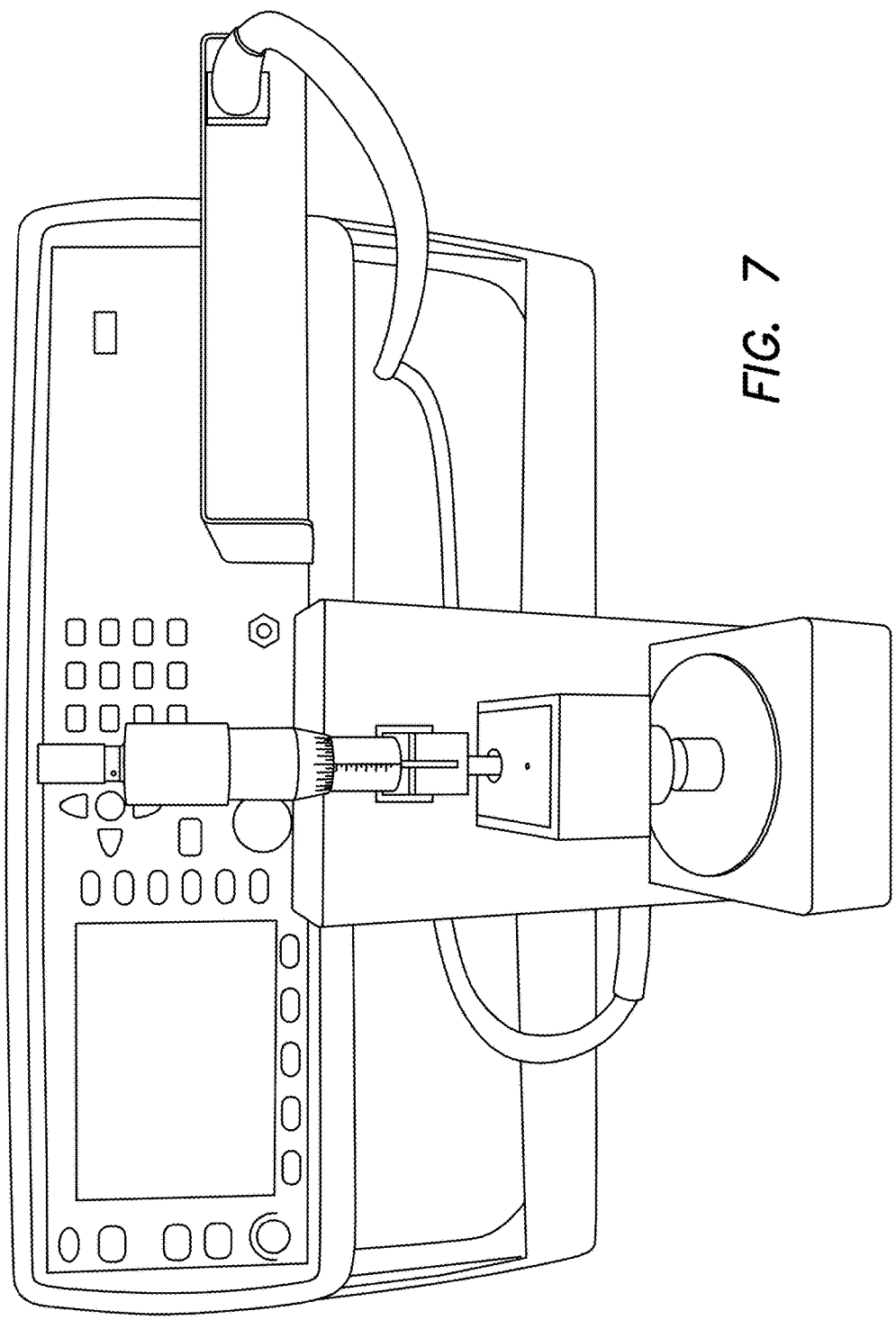

Capacitance, DF, and ESR were measured for a frequency range of 20 Hz to 2 MHz using a Dielectric Test Fixture 1645-1B together with an Agilent E4980A precision inductance, capacitance, and resistance (LCR) meter, shown in FIG. 7. The capacitance was initially assumed small, and therefore, measurements were made using the LCR meter's parallel mode. If the values were found to be higher than expected, then the instrument could be reset to use series mode. The dielectric constant of the samples was determined from the instrument's reported capacitance value. No porosity correction was made to the dielectric constant. FIG. 7 shows Agilent E4980A precision LCR meter (top) and Dielectric Test Fixture 1645-1B (bottom).

Dielectric Ink Formulation

To perform 3D additive manufacturing, the powders were first converted into an ink. The formulation for this ink is shown in table 4. Glass particulates were used to increase densification, but high quantities of glass particles decrease the permittivity, so the concentration of glass was kept as low as possible to produce a usable ink. Surfactant was used as a wetting agent to allow the ink to spread. A thinner was also used to get the proper ink viscosity. Texanol™ was used as a thinner because it volatilizes at 120° C. The vehicle was an organic binder formulated from a blend of Ashland Chemical ethyl cellulose in Texanol ester solvent. It was used to further enhance the viscosity of the ink. The vehicle was chosen because it volatilizes between 250° C. and 350° C. during sintering.

TABLE 4

Dielectric ink formulation.

| Component | Concentration (%) |
|---|---|
| BaTiO$_3$ dielectric 32 | 72.5 |
| Lead-germinate high K glass | 7.5 |
| Surfactant (wetting agent) | 0.5 |
| Texanol (solvent) | 5 |
| Ethyl cellulose organic vehicle | 15 |

The dielectric ink 24a formulation was mixed and then ground in a three-roll mill. A three-roll mill is a tool that uses shear force by three horizontally positioned rolls rotating at opposite directions and different speeds relative to each other to mix, refine, disperse, and homogenize viscous materials fed into it. The final ink was a dense, homogenous mixture used for screen printing.

Three-Dimensional Additive Thin Film Deposition

Figure 8:
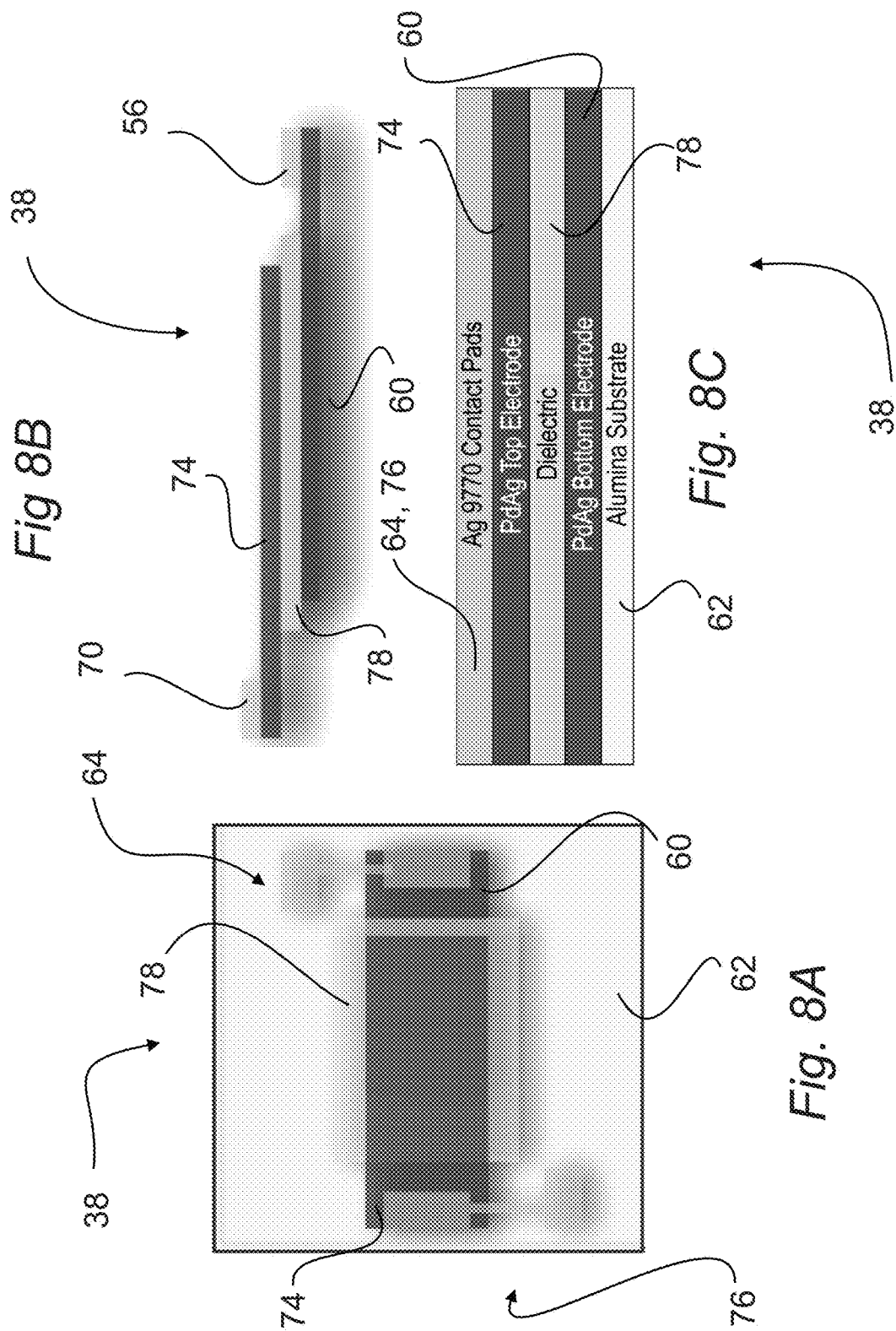
FIG. 8A Top view of ultracapacitor cell
FIG. 8B Side view of ultracapacitor cell
FIG. 8C Layer view of ultracapacitor cell
FIG. 9 Eight-zone belt furnace temperature settings. Zones 1-8 are the individual heated zones; PV=present temperature value; FV=future, or desired temperature value for the profile; and SV=set temperature value for the individual heater zone controller.
Figure 9:
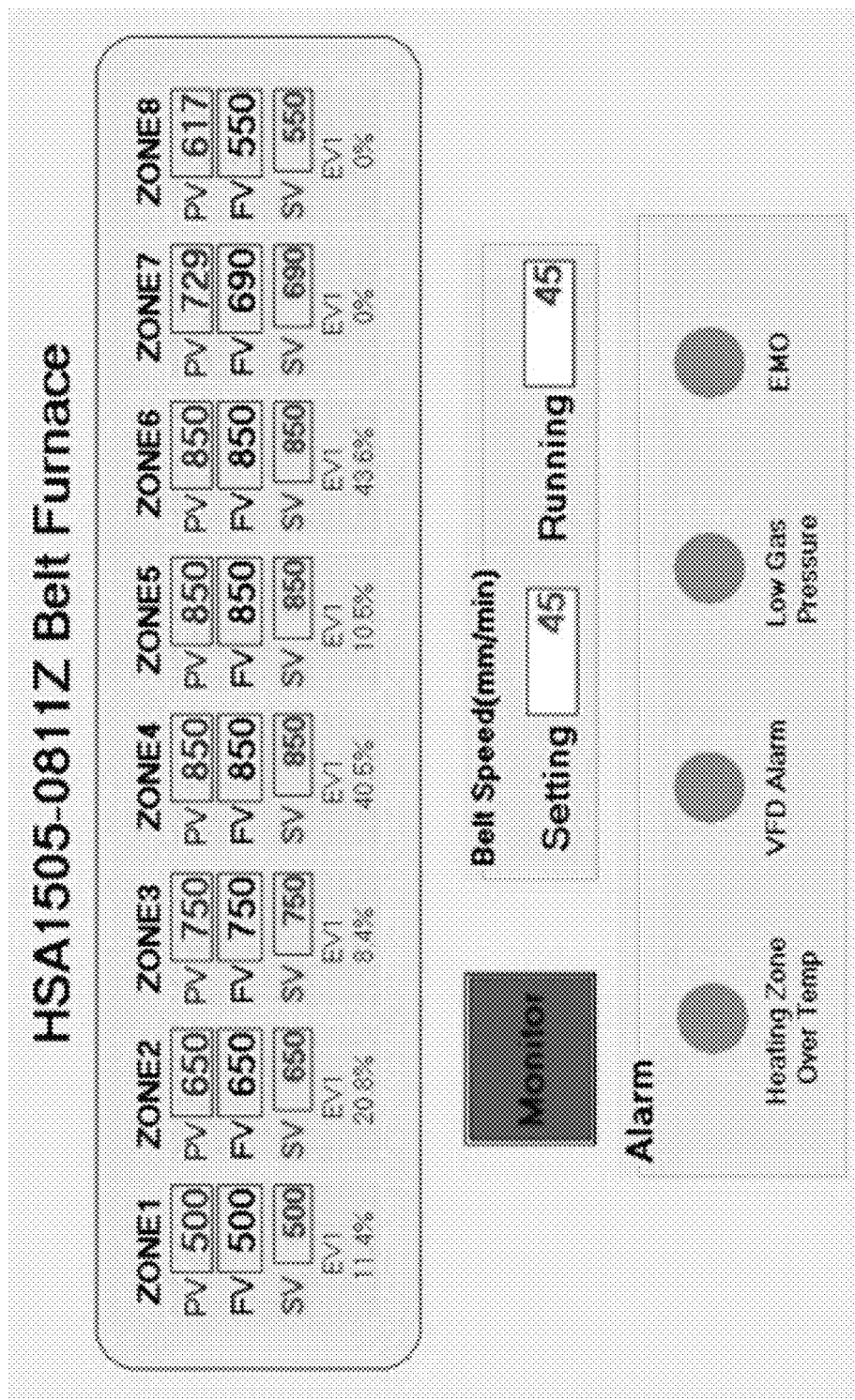
Figure 10:
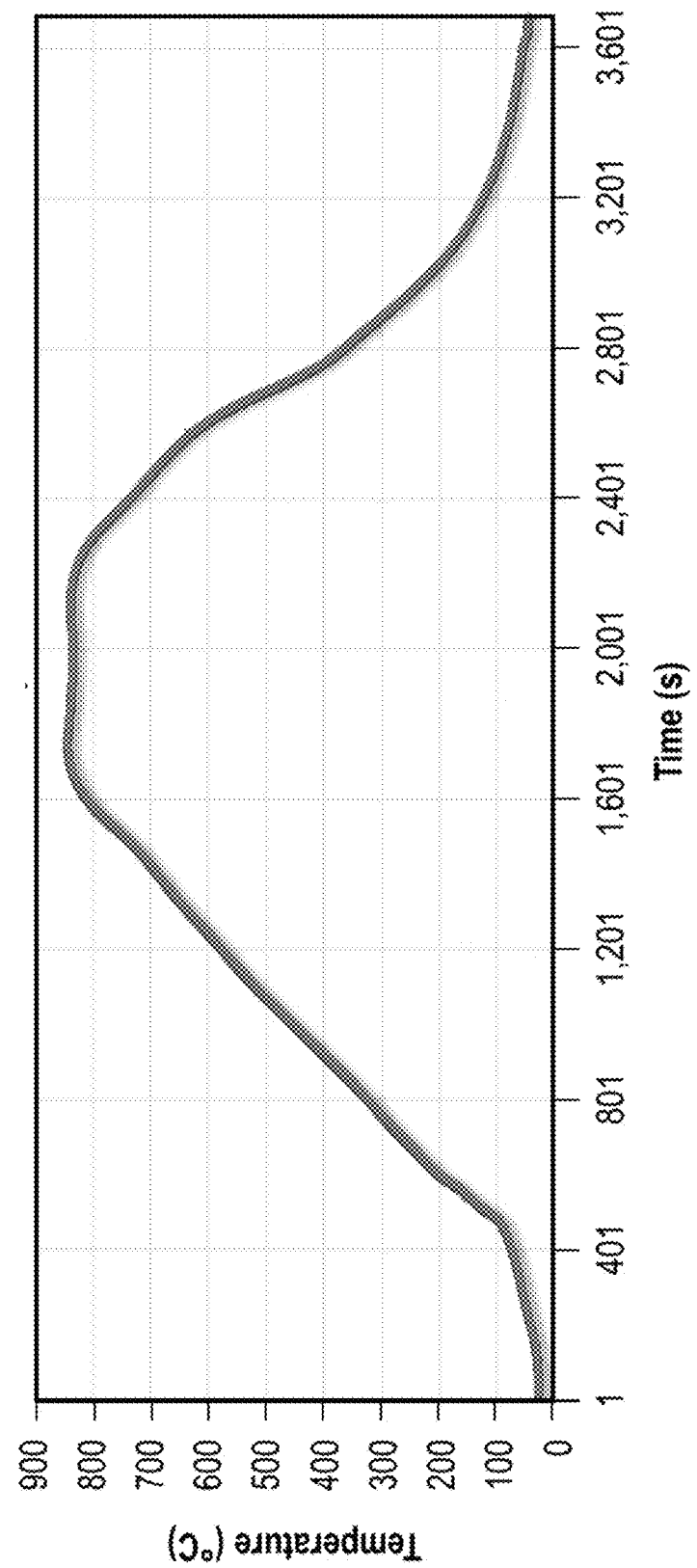
FIG. 10 Belt furnace temperature profile
FIG. 11A SEM image of uncoated, untreated $BaTiO_3$
FIG. 11B SEM image of $BaTiO_3$ coated with $Al_2O_3$ but untreated.

The screen printing method was the chosen method of printing a test cell for this study. This technique can produce layers as thin as 5 μm. By producing such a thin dielectric layer, the capacitance equation shows that the energy stored can be increased significantly. The screen printing process began by creating a capacitor design on a woven mesh using photolithography. The ink was forced into the mesh openings by a squeegee and onto the printing surface during the squeegee stroke. The larger the number of intertwined meshes, the thinner the deposition became for a single stroke. The capacitor layers (FIGS. 8A-8C) were printed using a Hary Manufacturing, Inc. (Lebanon, N.J.) 485 precision screen printer. Palladium silver ink that is used in multilayer chip capacitors due to its conductance and resistance to silver migration was used as the electrode 60, 74 material. Al$_2$O$_3$ (0.039 in and 96% purity) was used as the substrate 62 on which each layer was deposited. Al$_2$O$_3$ was chosen because it has a very low coefficient of expansion and will not impart excessive stress during later sintering steps. As a result, each layer is only able to densify in the z-axis due to clamping to the substrate 62. The ultracapacitor test cells 38 were made using two layers of dielectric ink 24a applied through 325 and 400 mesh screens. FIGS. 8A-8C shows views of the ultracapacitor 38 cell: 8A Top, 8B side, and 8C layers The capacitor test cell was sintered using a HAS 1505-0811Z belt furnace from HengLi Eletek Co. (San Diego, Calif.) at 850° C. peak for 10 min and a total cycle time of 1.5 hr. This sintering step was performed after each layer of deposition in order to burn off organic materials and achieve high densification. The temperature settings of the eight-zone belt furnace are shown in FIG. 9, the temperature profile in FIG. 10, and the N$_2$ flow profile in table 5. Previous work shows that when reduced SiO$_2$-coated 48 BaTiO$_3$ 40 is post-annealed at 800° C. for 12 hr. in air, it remains blue, while reduced uncoated BaTiO$_3$ 40 turns white. For this reason, the SiO$_2$ shell 48 is thought to act as an efficient barrier against oxidation. As a further preventative measure, the belt muffle furnace was purged with N$_2$ to avoid re-oxidation. Densification of the dielectric layer was then evaluated with the scanning electron microscope (SEM). FIG. 9 shows temperature settings for the eight-zone belt furnace. On FIG. 9, zones 1-8 are the individual heated zones; PV stands for present temperature value; FV stands for future, or desired temperature value for the profile; and SV stands for set temperature value for each individual zone heater controller. FIG. 10 shows the belt furnace temperature profile.

TABLE 5

Furnace N$_2$ flow profile.

| Section | Nitrogen Flow (LPM) |
|---|---|
| Entrance curtains | 40 |
| Preheat | 45 |
| Venturi exhaust | 100 |
| Cooling gas | 20 |
| Exit curtains | 20 |

Thin Film Electrical Characterization

The ultracapacitor 38 test cell was measured for parallel capacitance using an LCR meter. Capacitance readings were then used to determine if the device was functional. Samples that showed functionality were also tested via the discharge method. To use the discharge method, the capacitor was discharged through a resistor that was chosen to yield a reasonable time constant. The voltage versus time plot was captured with a DP05104 digital phosphor oscilloscope (Marietta, Ga.). A large region of the discharge curve was chosen, and the values of voltage in the discharge cycle and time required to drop between the two voltages were entered into equation (12) along with the known resistor value. In this equation, t is the time it takes to discharge the capacitor between some initial voltage (V) to some final volt-age (Vf). The capacitance (C) is to be determined, and R is a resistor through which the capacitor is discharged:

$$t = C * R * \ln\left(\frac{V_f}{V_i}\right). \qquad (12)$$

Analysis

Pellet Electrical Characterization

Figure 11C:
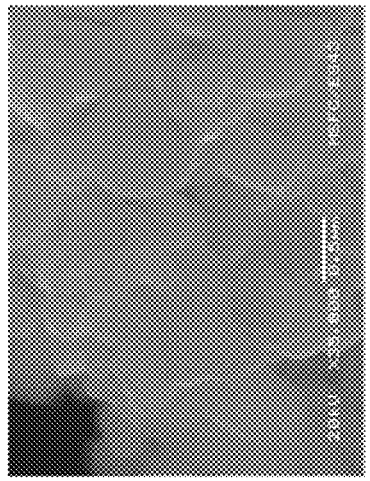
FIG. 11C SEM image of $BaTiO_3$ coated with $Al_2O_3$ and treated at 750° C. for 30 hr.
Figure 11B:
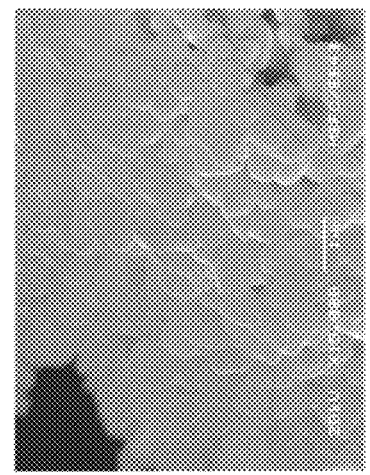
Figure 11A:
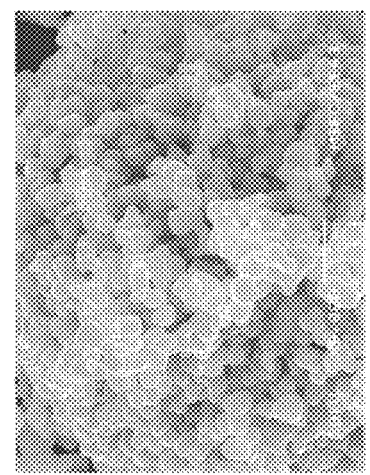

SEM images of the untreated particles 40 (FIGS. 11A and 11B) revealed that particles indicated by the manufacturer to be 500 nm actually varied in diameter from 250 nm up to 1 μm. Treated particles 32 (FIG. 11C) also showed varying particle sizes of the same range. These observations show that the furnace treatment was not causing large scale grain growth. FIGS. 11A-11C show SEM images of BaTiO$_3$ 40:

11A uncoated, 11B coated with Al$_2$O$_3$ 44, and 11C Al$_2$O$_3$ 44 coated, treated at 750° C. for 30 hr.

Figure 12C:
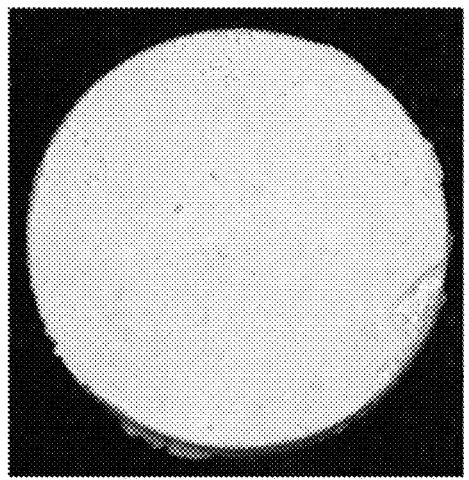
FIG. 12A Optical microscopy photographs of (a) uncoated $BaTiO_3$ pellets (untreated)
FIG. 12B Optical microscopy photographs of coated, $BaTiO_3$ pellets (untreated)
FIG. 12C Optical microscopy photographs of $Al_2O_3$ coated $BaTiO_3$ pellets (untreated)
FIG. 13A Optical microscopy photographs of uncoated, $BaTiO_3$ pellets treated at 900° C. for 1 hr.
Figure 12B:
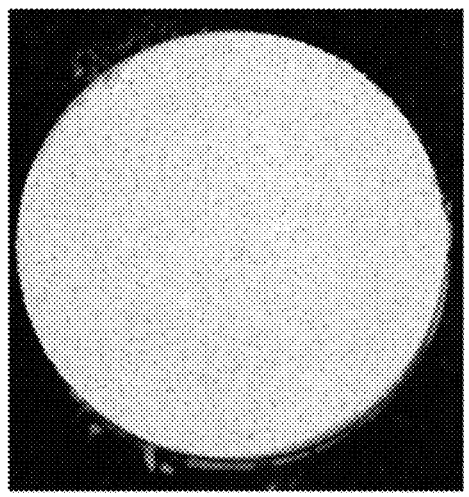
Figure 12A:
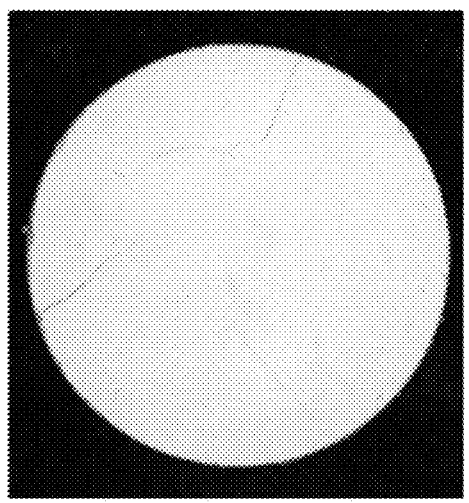

All three batches of particles 32, 12 were initially white in color, as can be seen in FIGS. 12A-12C. When treated at temperatures below 900° C., they turned to a bright yellow or a neon green color. These particles remained that color or under the reducing forming gas atmosphere and changed to white after the first minute of exposure to air. Scraping off the top layer of the treated powder revealed two shades of color: a lighter tone on top and a darker tone underneath. This non-uniform color, shown in FIGS. 13 and 14, indicates that the particles were not being reduced homogeneously. This indicated that proper reduction of the particles had to be done individually in a fluidized bed as opposed to pelletized form and this treatment method was adopted. FIGS. 12A-12C show optical microscopy photographs: 12A uncoated, 12B SiO$_2$-coated 48, and 12C Al$_2$O$_3$ 44 coated BaTiO$_3$ 40 pellets (untreated). FIGS. 13A-13B show optical microscopy photographs: 13A uncoated, 13B SiO$_2$-coated 438, and 13C Al$_2$O$_3$ 44 coated BaTiO$_3$ 40 pellets treated at 900° C. for 1 hr. FIGS. 14A-14C show optical microscopy photographs: 14A uncoated, 14B SiO$_2$-coated 48, and 14C Al$_2$O$_3$ 44 coated BaTiO$_3$ 40 pellets treated at 1,100° C. for 1 hr.

Figure 15A:
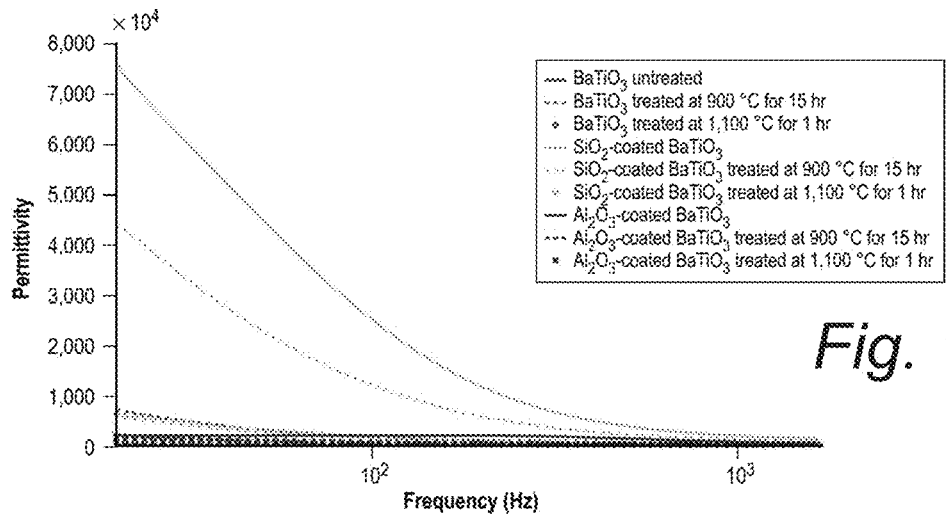
FIG. 15A Plots of permittivity of samples treated at 900° C. for 15 hr. and 1,100° C. for 1 hr. compared to the untreated powders
FIG. 15B Plots of DF of samples treated at 900° C. for 15 hr. and 1,100° C. for 1 hr. compared to the untreated powders
FIG. 15C Plots of ESR of samples treated at 900° C. for 15 hr. and 1,100° C. for 1 hr. compared to the untreated powders
FIG. 16A Plots of permittivity of samples treated at 900° C. for 1 hr. compared to the untreated powders
FIG. 16B Plots of DF of samples treated at 900° C. for 1 hr. compared to the untreated powders
FIG. 16C Plots of ESR of samples treated at 900° C. for 1 hr. compared to the untreated powders
FIG. 17 Ultracapacitor test cell made from $SiO_2$-coated $BaTiO_3$ deposited by screen printing
FIG. 18A Plots of permittivity of powdered samples treated at 900° C. for 1 hr. before and after furnace sintering
FIG. 18B Plots of DF of powdered samples treated at 900° C. for 1 hr. before and after furnace sintering
FIG. 18C Plots of ESR of powdered samples treated at 900° C. for 1 hr. before and after furnace sintering
FIG. 19A SEM image at a magnification of 500 showing the level of densification of $SiO_2$-coated $BaTiO_3$ test cell with 184 nF of capacitance processed at 900° C. for 1 hour.
Figure 15B:
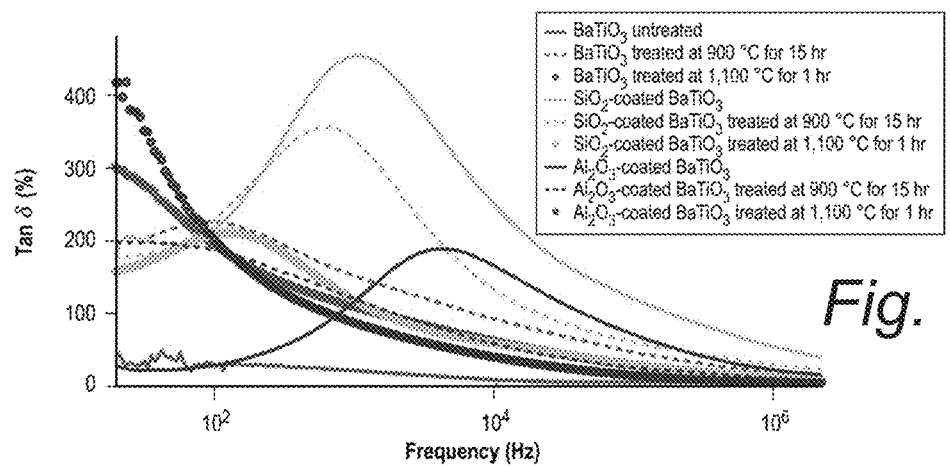
Figure 15C:
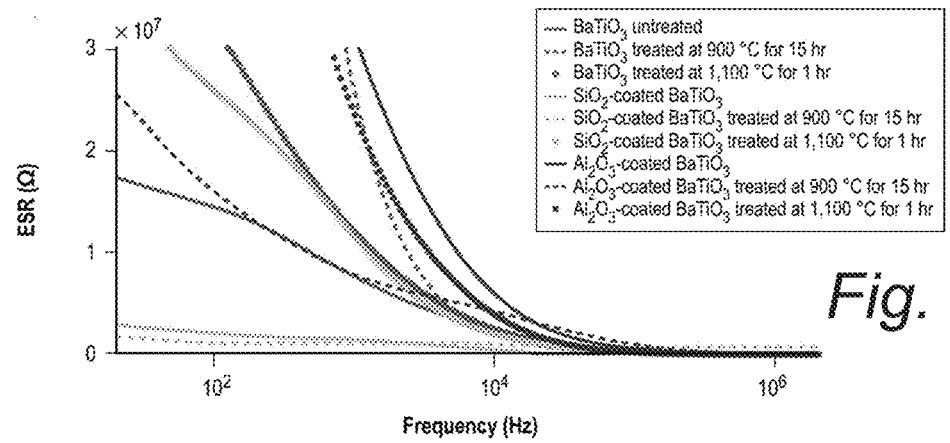

At temperatures below 900° C., no significant changes were seen in the permittivity. At temperatures above 900° C., the permittivity and DF slightly increased for uncoated BaTiO$_3$ 40 and decreased for coated samples 44, 48. The ESR decreased only for the Al$_2$O$_3$ 44 coated sample, the greatest decrease occurring with 900° C. treatment. The decrease in ESR seen in FIGS. 15A-15B coincides with the color change seen in FIGS. 14A-14B. This can be interpreted as the material undergoing reduction.

The synthesis conditions that produced the maximum increase in permittivity for all samples was at 900° C. for 1 hr. Table 6 shows the effect of a short-duration treatment versus a long-duration treatment with constant (900° C.) temperature. The SiO$_2$-coated sample exhibits the highest permittivity.

TABLE 6

Synthesis profile effect on dielectric permittivity.

| At 20 Hz | Untreated | | 1 hr. at 900° C. | | 15 hr. at 900° C. | |
| --- | --- | --- | --- | --- | --- | --- |
| BaTiO$_3$ 40 | Color | Permittivity | Color | Permittivity | Color | Permittivity |
| Uncoated 40 | White | 9 | White | 2,227 | White | 708 |
| Al$_2$O$_3$-coated 44 | White | 217 | Light blue | 6,886 | Navy blue | 182 |
| SiO$_2$-coated 48 | White | 7,638 | Grey | 19,980 | Grey | 4,384 |

Figure 16A:
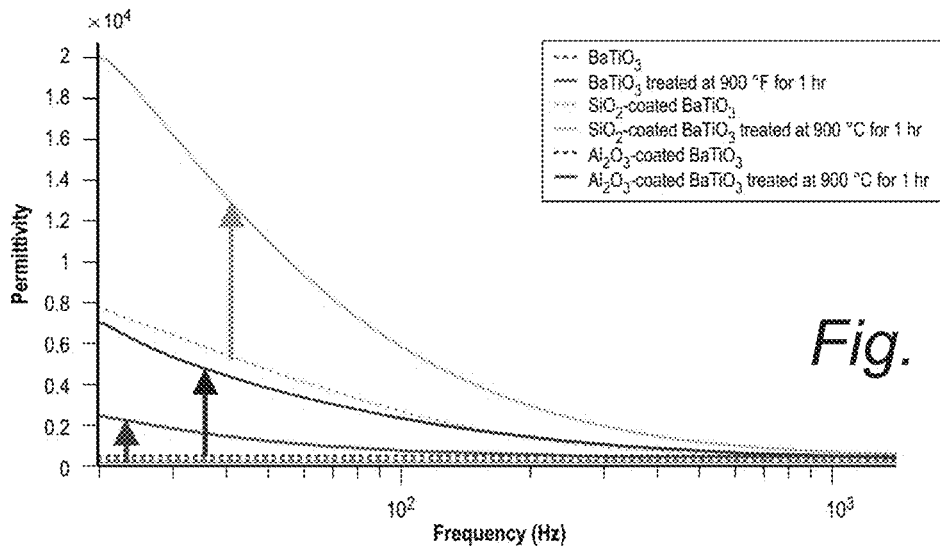
Figure 16B:
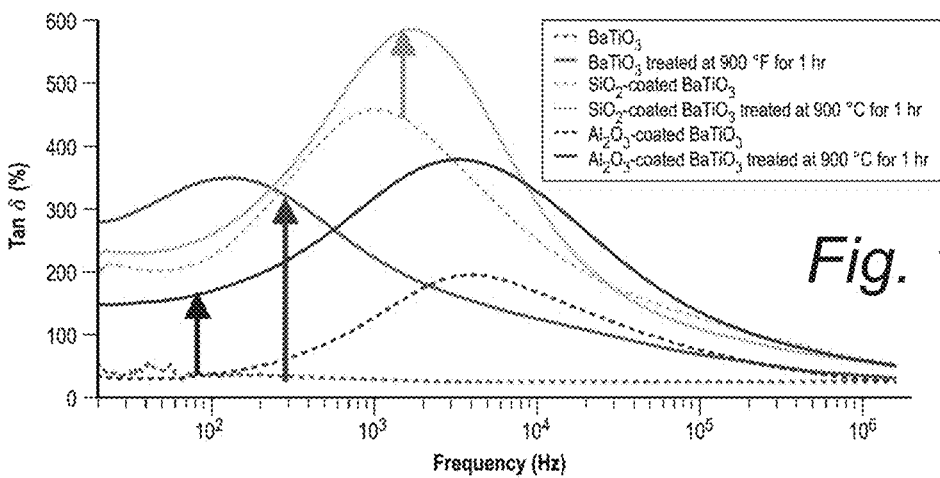
Figure 16C:
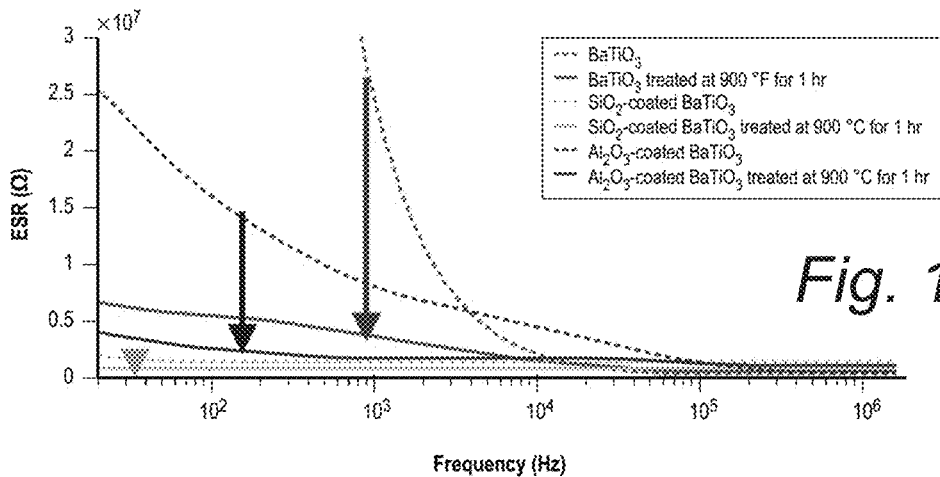

The capacitor properties versus frequency of the samples treated at 900° C. for 1 hr. are compared in FIGS. 16A-16B. Low-frequency permittivities are high (maximum: 19,980 at 20 Hz), indicating the dielectric would be good for DC applications. The DF was found to increase with treatment. The decreased ESR for all treated powders indicated that they are becoming semiconducting, one of the desired outcomes for the IBLC effect. SiO$_2$-coated 48 and Al$_2$O$_3$ 44 coated BaTiO$_3$ 40 treated at 900° C. for 1 hr. SiO$_2$-coated 48 and Al$_2$O$_3$-coated 44 BaTiO$_3$ 40 treated at 900° C. for 1 hr were chosen as the dielectric for the capacitor test cell because of they had the best capacitance traits.

Thin Film Electrical Characterization

Figure 17:
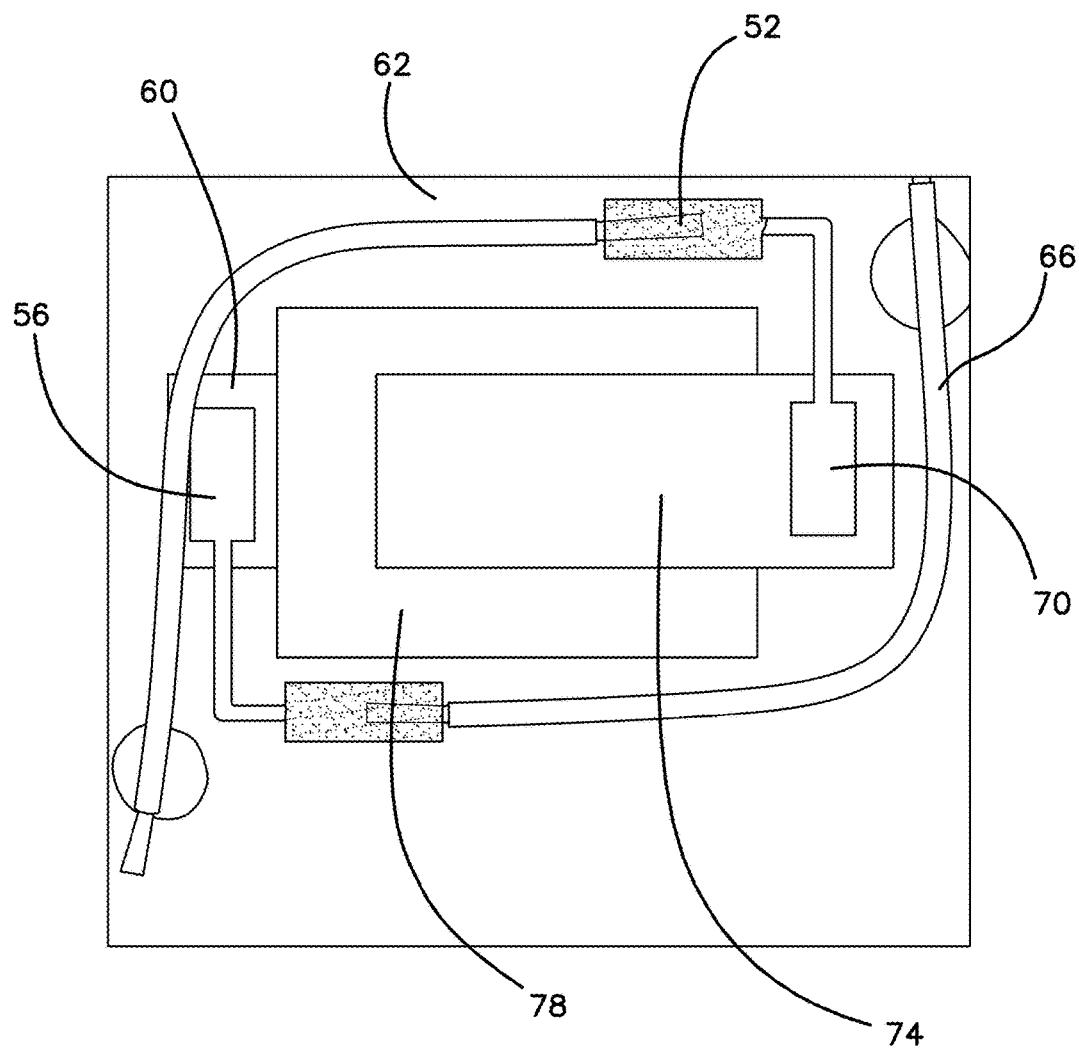
Figure 18A:
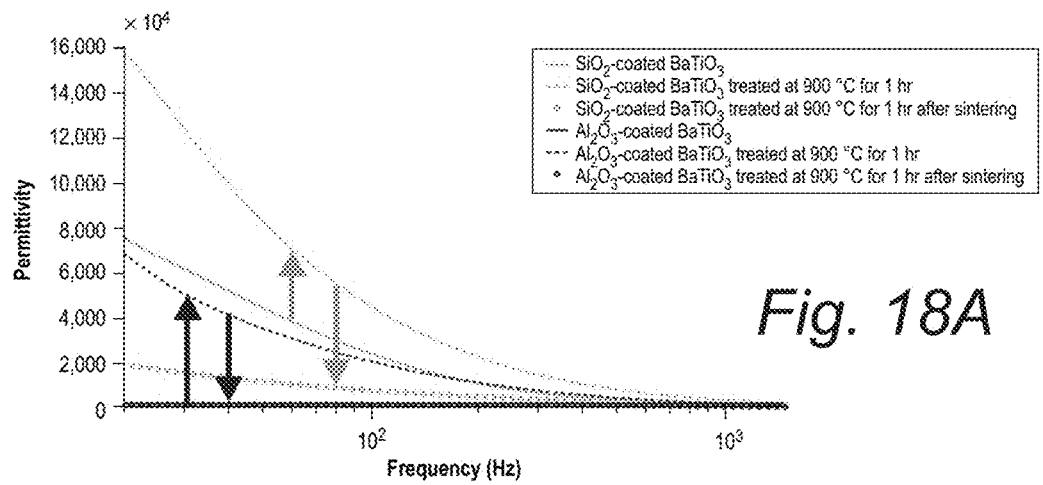
Figure 18B:
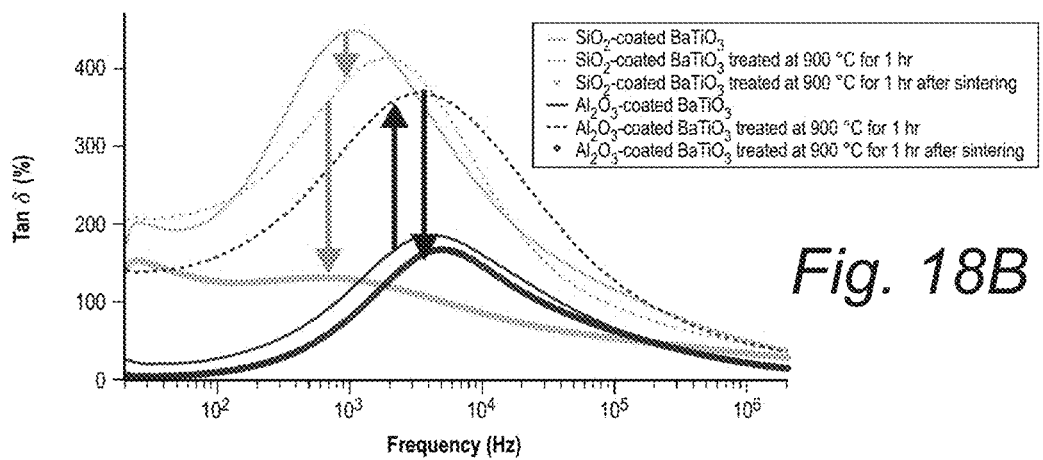
Figure 18C:
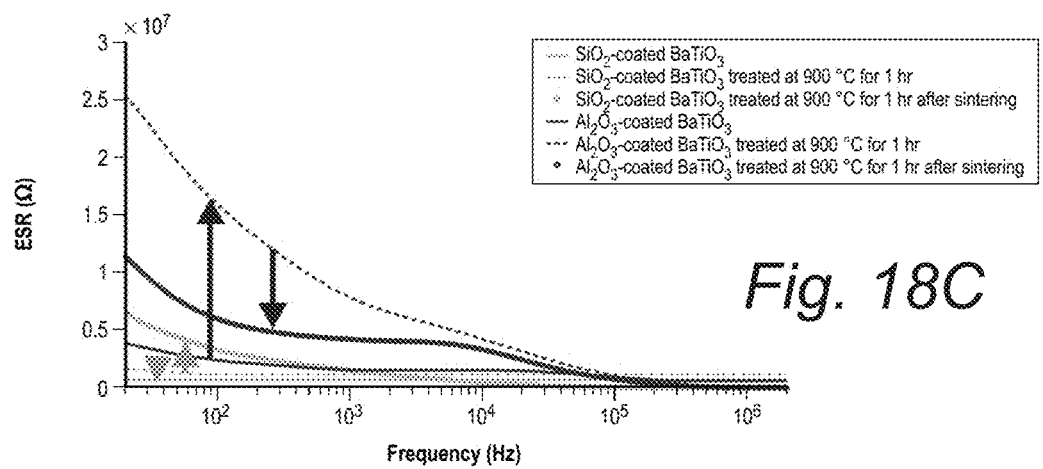
Figure 19A:
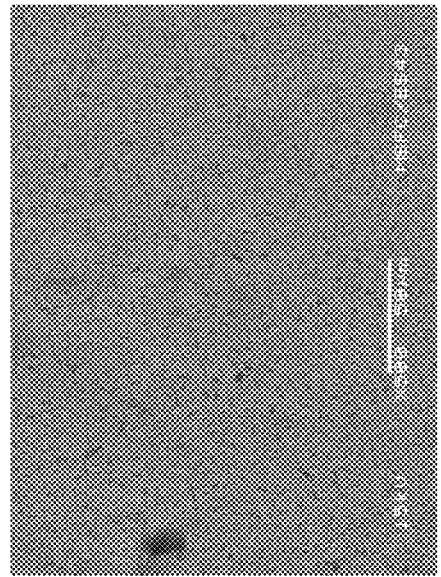
FIG. 19B SEM image at a magnification of 3,000 showing the level of densification of $SiO_2$-coated $BaTiO_3$ test cell with 184 nF of capacitance processed at 900° C. for 1 hour.
FIG. 19C SEM image at a magnification of 5,000 showing the level of densification of $SiO_2$-coated $BaTiO_3$ test cell with 184 nF of capacitance processed at 900° C. for 1 hour.
FIG. 19D SEM image at a magnification of 10,000 showing the level of densification of $SiO_2$-coated $BaTiO_3$ test cell with 184 nF of capacitance processed at 900° C. for 1 hour.
Figure 19B:
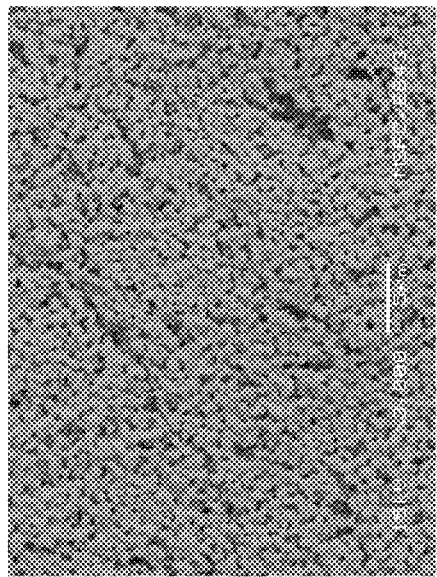
Figure 19C:
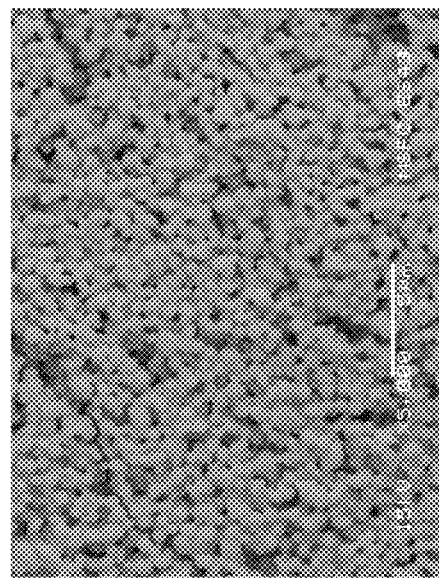
Figure 19D:
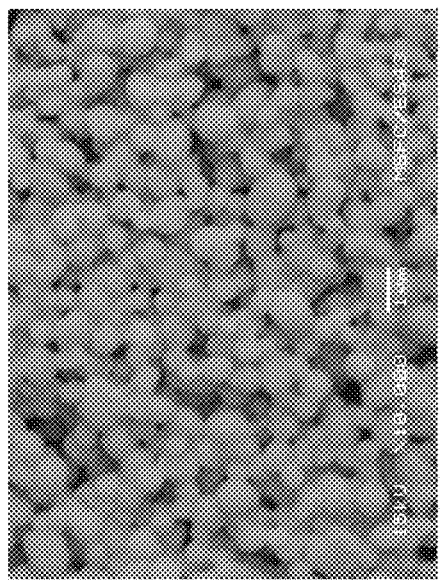

FIG. 17 shows an ultracapacitor test cell made with SiO$_2$-coated 48 BaTiO$_3$ 40.

SEM images (FIG. 19) of the ultracapacitor 38 test cells showed a 70%-80% densification. The thickness for samples built using the 325 mesh was an average of 20 µm. The capacitance obtained through the discharge method using a DC source agreed with the LCR measured capacitance values within ±5%. The voltage versus time plot for the 184.2 nF capacitor is shown in FIG. 20.

Figure 20:
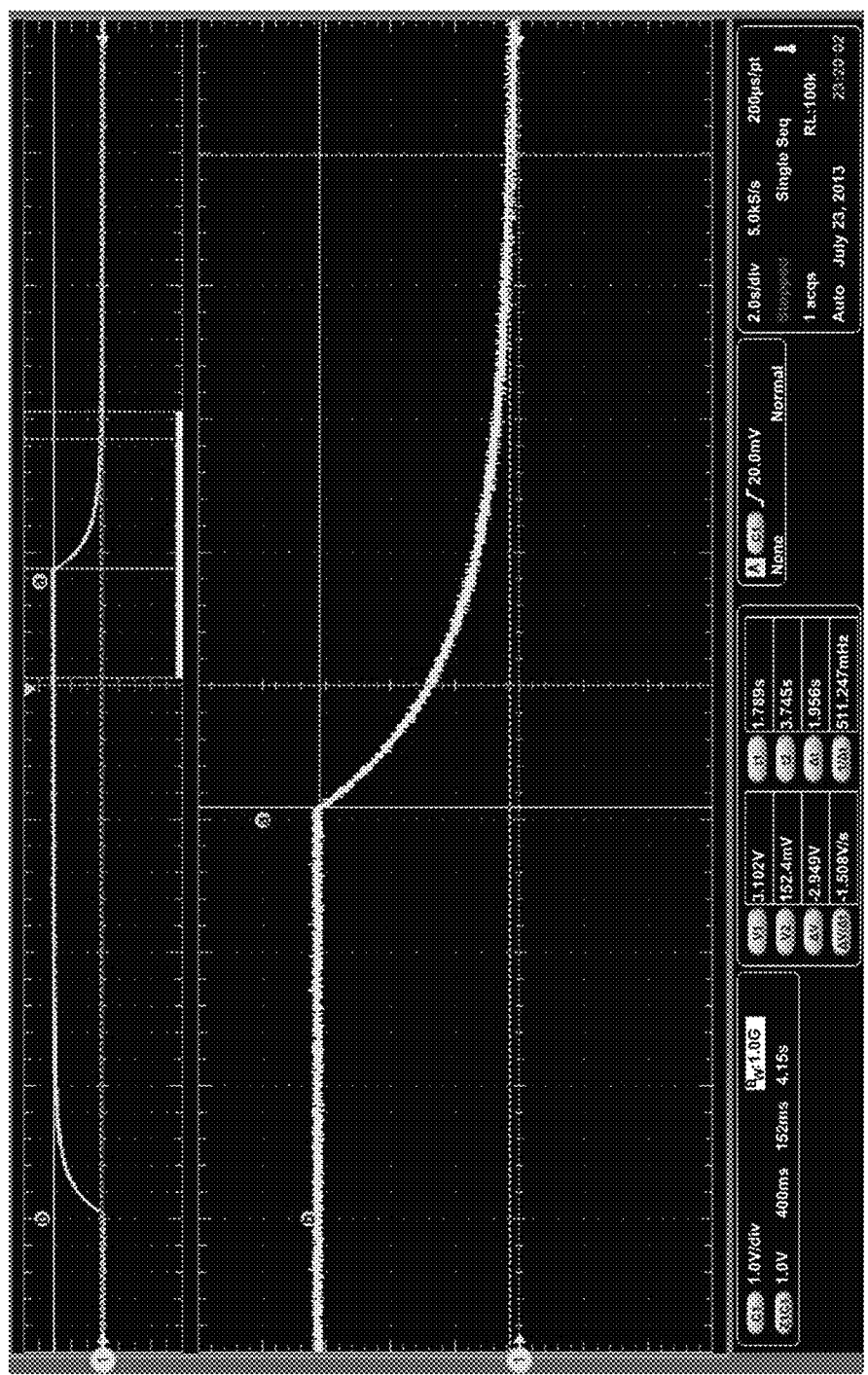
FIG. 20 Voltage versus time used for the direct current (DC) discharge test method.

FIG. 20 shows voltage versus time used for the discharge method.

Figure 21A:
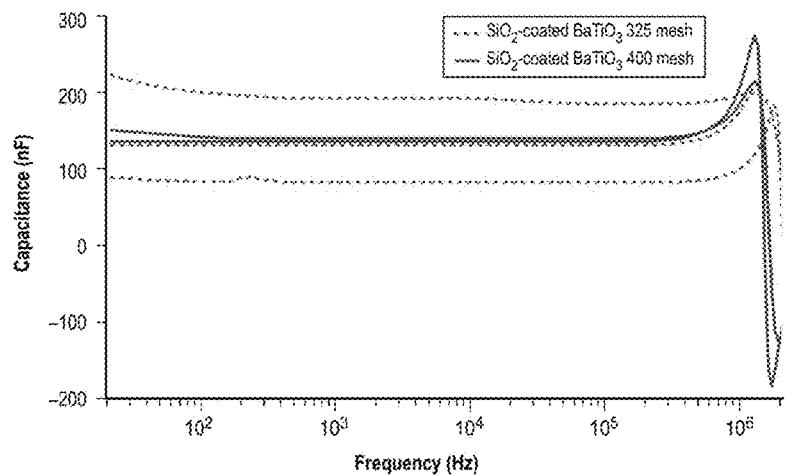
FIG. 21A Plots of capacitance of the capacitor test cells, made from the dielectric material treated at 900° C. for 1 hr., before and after furnace sintering FIG. 21B Plots of DF of the capacitor test cells, made from the dielectric material treated at 900° C. for 1 hr., before and after furnace sintering FIG. 21C ESR of the capacitor test cells, made from the dielectric material treated at 900° C. for 1 hr., before and after furnace sintering FIG. 22 Nine, multilayered ultracapacitor cells in parallel printed on a substrate board. Cells can be printed serially or in parallel to get the desired voltage or capacitance. This is known as a slice.
Figure 21B:
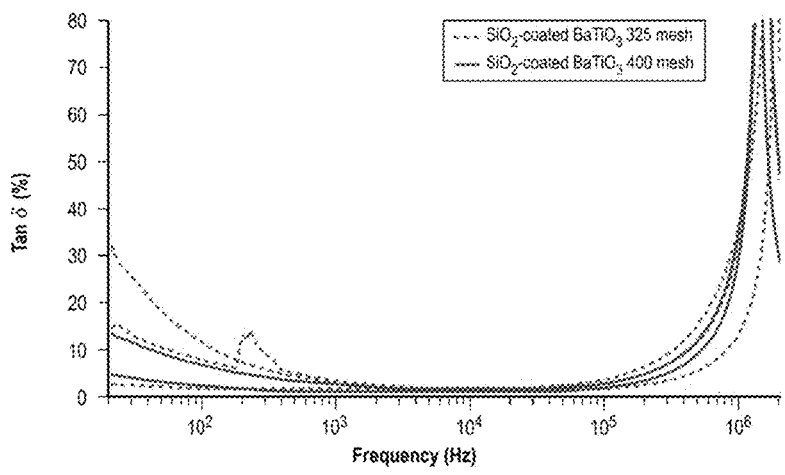
Figure 21C:
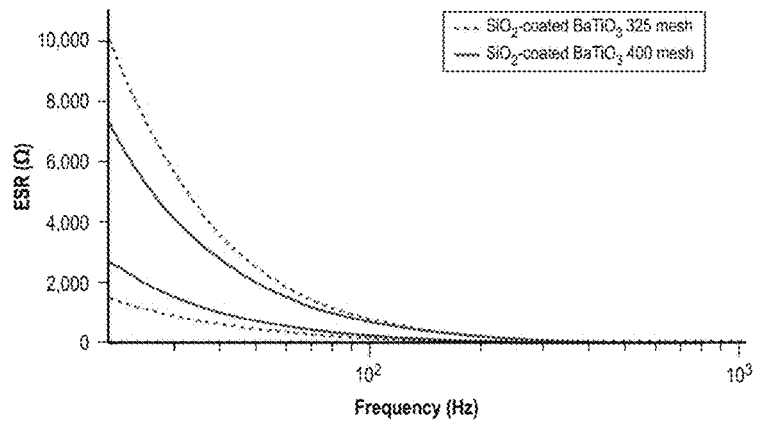
Figure 23:
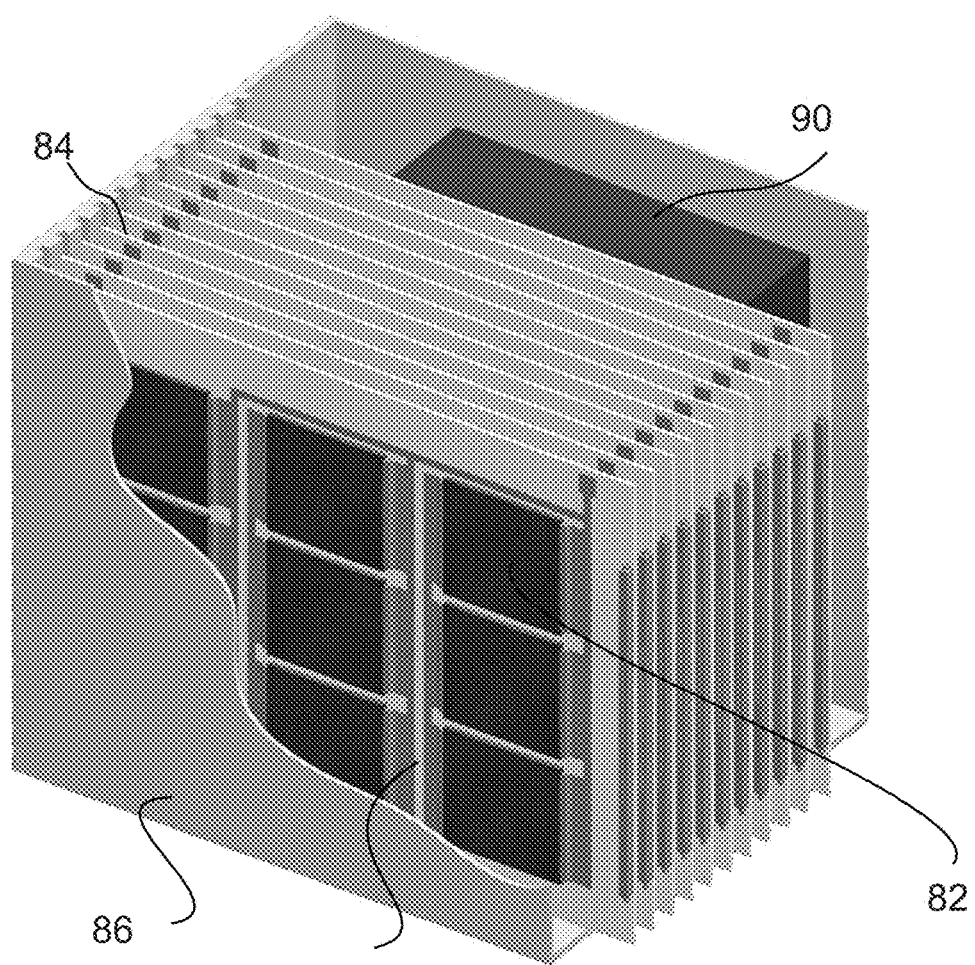
FIG. 23 Ultracapacitor module where multilayered capacitor boards (or slices) are stacked in a housing with active or passive cooling to increase energy storage.

Electrical characterization (FIGS. 21A-21C) shows normal capacitor behavior up to 1.3 MHz. Above the latter frequency, the capacitor test cells exhibit a negative capacitance and a DF that spikes up to 3×103. This negative capacitance effect is observed in a variety of semiconductor devices.

Experimental II

Several capacitors 38 were made as described. An Agilent (Santa Clara, Calif.) 4294A impedance analyzer was used to characterize the dielectric/electric properties of these devices over a frequency range from 100 Hz to 100 MHz using Cp~D and R~X function. 301 points were chosen in this range.

A Solartron (West Sussex, UK) SI 1260 Impedance/Gain Phase Analyzer was used for the low frequency characterization from 0.1 Hz to 10 kHz at room temperature. In the experiments, the AC amplitude is a constant of 100 mV, while the DC bias is 0 V. 50 points were chosen in this range.

The P-E hysteresis loops were measured using Sawyer-Tower circuit (Radiant Technologies Precision LC unit, Albuquerque, N. Mex.). The profile is standard bipolar and frequency is 10 Hz.

Figure 24A:
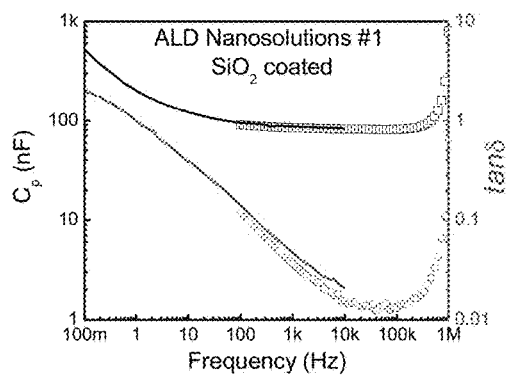
FIGS. 24A-24D show frequency dependence of Cp~D and $\in_r$ for 2 different samples at room temperature from 0.1 Hz to 1 MHz.
Figure 24C:
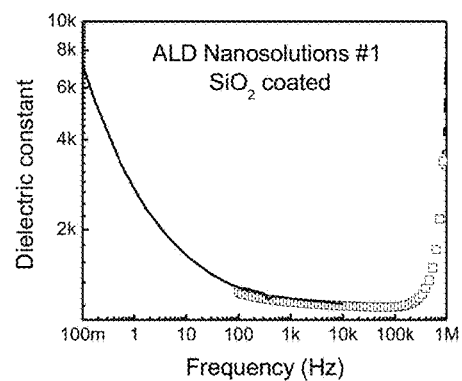
Figure 24B:
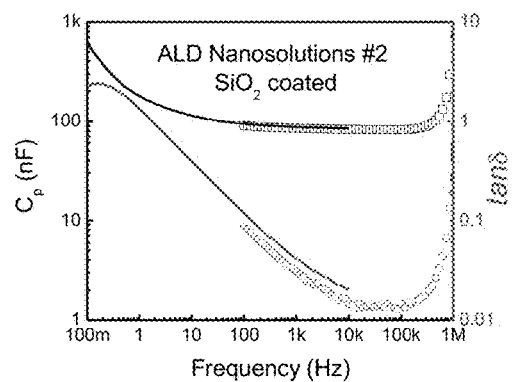
Figure 24D:
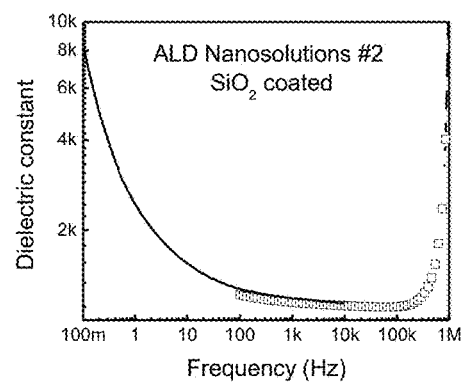

FIGS. 24A-24B show the two results combined: 1) high frequency using Agilent 4294A impedance analyzer (100 Hz~1 MHz) (open dot) and 2) Low frequency using Solartron SI 1260 Impedance/Gain Phase Analyzer (0.1 Hz~10 kHz) (solid line). The capacitance of ALD#1 is about 500 nF. The capacitance of ALD#2 is about 600 nF.

CONCLUSIONS

A material and set of processing conditions were selected that gave the optimal properties for fabricating a capacitor 38. The material of choice, SiO$_2$-coated 48 BaTiO$_3$ 40, exhibited the highest dielectric permittivity. This particular sample was treated at 900° C. for 1 hr. The processed material exhibited the following properties at 20 Hz: permittivity of 19,980, a DF of 215%, and an ESR of 806 kOhms. A test cell was built with the selected material at a thickness of 13.5 µm, and it exhibited a capacitance of 125 nF at 1 kHz. The breakdown voltage of this sample was measured to be 450V. The calculated energy density based on a 184 nF capacitor at this breakdown voltage would be about 5 J/cc. Treatment at temperatures below 900° C. does not significantly affect the dielectric properties of the material. The decrease in properties for samples treated above 900° C. may be attributed to an over reduction or to excess inter-diffusion. $SiO_2$, although it did not experience a color change, had the highest initial and after treatment permittivity. The color tone difference within a powder batch after being reduced indicates that a better sealed tube furnace or other synthesis techniques like the fluidized bed process, are necessary to obtain a homogeneous treatment.

The following reference numbers are used on FIGS. 1-24.
4 positive electrode
6 air gap capacitor
8 resistive load
10 electrolytic capacitor
12 applied voltage
16 current flow
20 negative electrode
22 electrolyte
24 air dielectric
24a dielectric ink
26 separator
28 current collector
32 grain of conductive ceramic
36 capacitive grain boundary
38 IBLC capacitor
40 BaTiO3 particle
44 Al2O3 coating
48 SiO2 coating
52 soldered connection to test lead
56 connection soldered to bottom electrode
60 bottom electrode
62 substrate
64 bottom contact pad
66 test lead
70 connection soldered to top electrode
74 top electrode
76 top contact pad
78 dielectric made in accordance with this invention
82 multilayer capacitor cell
84 multilayer capacitor slice
86 housing
90 cooling block Thus, the present invention has been described herein with reference to a particular embodiment for a particular application. Those having ordinary skill in the art and access to the present teachings will recognize additional modifications, applications and embodiments within the scope thereof It is therefore intended by the appended claims to cover any and all such applications, modifications and embodiments within the scope of the present invention.

What is claimed is:

1. A method of manufacturing a capacitor comprising the steps of:
    a) obtaining $BaTiO_3$ particles; said particles having an average grain diameter of 100-700 nm;
    b) treating said particles in a first furnace under a mixture of 70-96% by volume $N_2$ and 4-30% by volume $H_2$ gas for 60-90 minutes at 850-900° C.;
    c) coating said treated particles with a 3-20 nm thick film of $SiO_2$ or a 3-10 nm thick film of $Al_2O_3$ whereby said coated treated particles become agglomerated;
    d) separating said coated, treated particles to break up said agglomeration into individual particles;
    e) incorporating said separated, coated, treated particles into an ink comprising:
        i) 60-80% by weight separated, coated, treated particles;
        ii) 5-50% by weight high dielectric constant glass; said high dielectric constant glass being 0.5-10 μm in size;
        iii) 0.1-5% by weight surfactant;
        iv) 5-25% by weight solvent; and
        v) 5-25% by weight organic vehicle;
    f) depositing an electrode on a substrate; said electrode having a resistance between 1 mΩ and 10Ω;
    g) sintering said substrate and electrode;
    h) depositing a layer of said ink on said substrate and electrode by a deposition process so that said layer is continuous and has consistent thickness;
    i) removing solvent from said layer by drying for 15-30 minutes at 120-150° C. in air;
    j) repeating steps h) and i) until desired thickness is obtained;
    k) removing organic binder by exposing said substrate, electrode and ink to the following heating cycle:
        i) gradually increasing temperature to 280-350° C. over 45-90 minutes with a heating rate not exceeding 10-15° C. per minute
        ii) curing at 280-350° C. for 4-72 hours;
        iii) allowing said substrate, electrode and ink to cool to ambient temperature;
    l) sintering said at least one layer on said substrate by heating in a second furnace, at 850-900° C. for less than 5 minutes and allowing it to cool to ambient under $N_2$ atmosphere; said $N_2$ containing less than 25 ppm $O_2$; a thickness of said at least one layer being sufficient to produce a sintered layer 10-35 μm thick; and
    m) depositing a top electrode on said at least one layer; said top electrode having a resistance between 1 mΩ and 10Ω.

2. A method as claimed in claim 1 in which said coating process is atomic layer deposition.

3. A method as claimed in claim 1 in which said deposition process of step h) is aerosol jet deposition or silk screening or inkjet printing.

4. A method as claimed in claim 1 in which said separating is performed by a three roll mill or a high shear mixer.

5. A method as claimed in claim 1 in which said high dielectric constant glass is lead-germinate glass or zinc borate glass.

6. A method as claimed in claim 1 in which said surfactant is a phosphate ester.

7. A method as claimed in claim 1 in which said solvent is ester alcohol, terpineol or butyl carbitol.

8. A method as claimed in claim 1 in which said substrate is 0.038-0.040 inch thick and at least 96% pure $Al_2O_3$, aluminum nitride (AlN), zirconia, beryllium oxide (BeO) or uncured ceramic.

9. A method as claimed in claim 8 in which said uncured ceramic is a mixture of ceramic particles, a binder, a surfactant and a solvent.

10. A method as claimed is claim 9 in which said solvent is 2,2,4-trimethyl-1,3-pentandiol monoisobutyrate, terpineol ($C_{10}H_{18}O$) or butyl carbitol.

11. A method as claimed is claim 9 in which said surfactant is a phosphate ester.

12. A method as claimed in claim 1 in which said organic vehicle is ethyl cellulose.

13. A method as claimed in claim 1 in which said first furnace is a multizone belt furnace.

14. A method as claimed in claim 1 in which said first furnace is a fluidized bed vertical tube furnace.

15. A method as claimed in claim 1 in which said second furnace is a multizone belt furnace.

16. A method as claimed in claim 1 in which during sintering in step I), time under 600° C. is 30 minutes maximum; time under 800° C. is 20 minutes maximum; and total time is 60-90 minutes.

17. A method as claimed in claim 14 in which during sintering in step I), the heating rate is 45-55° C./minute from 300-500° C.; and the cooling rate is 45-55° C./minute from 700-300° C.

\* \* \* \* \*